ELECTRONIC RECEIVER FOR TIME DIVISION MULTIPLEX
Filed May 21, 1951 11 Sheets-Sheet 1
Fig_1 KEY TO FIG. 2
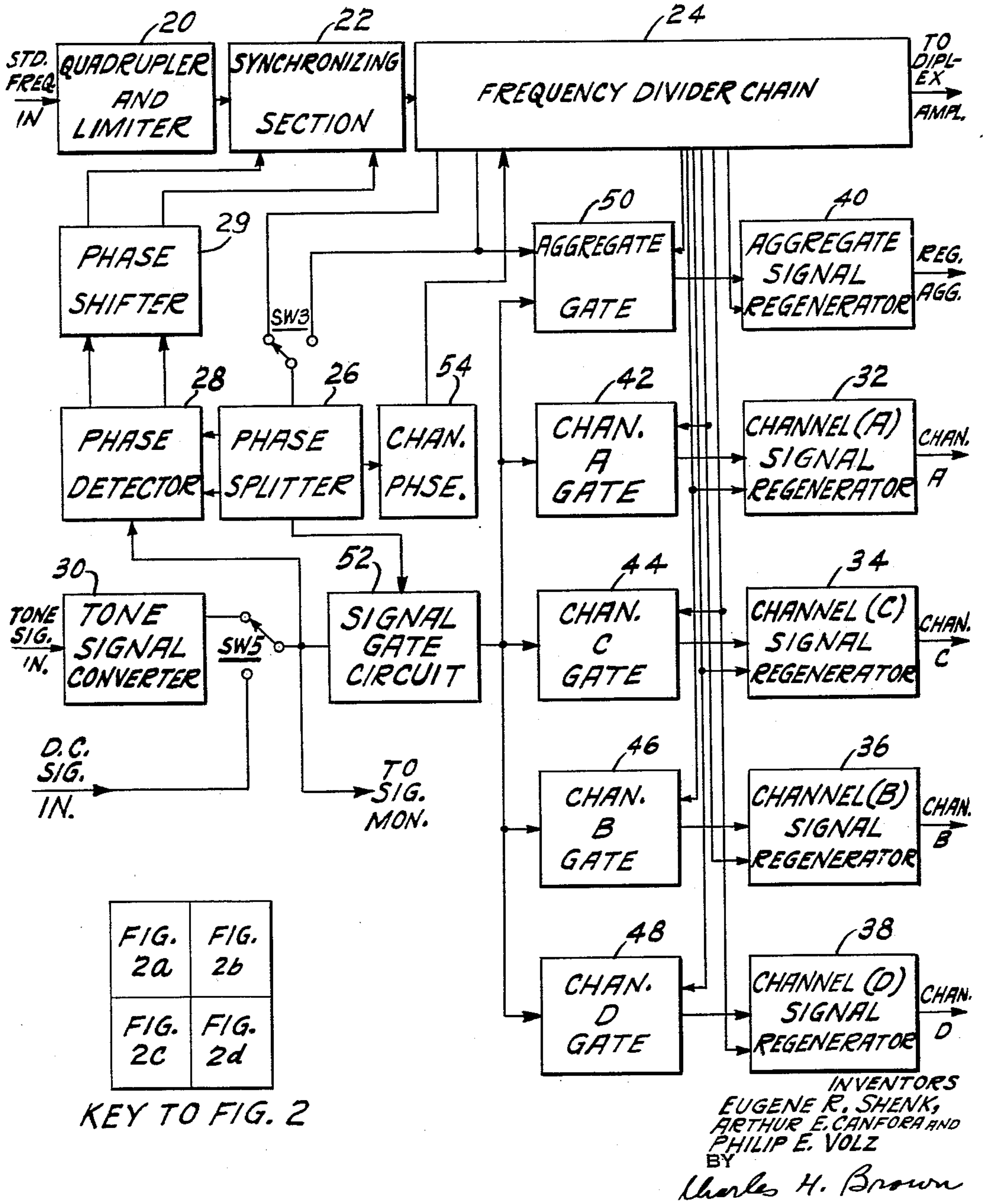
INVENTORS
EUGENE R. SHENK,
ARTHUR E. CANFORA AND
PHILIP E. VOLZ
BY
Charles H. Brown
ATTORNEY

ELECTRONIC RECEIVER FOR TIME DIVISION MULTIPLEX

Filed May 21, 1951

INVENTORS
EUGENE R. SHENK,
ARTHUR E. CANFORA AND
PHILIP E. VOLZ
BY Charles H. Brown
ATTORNEY

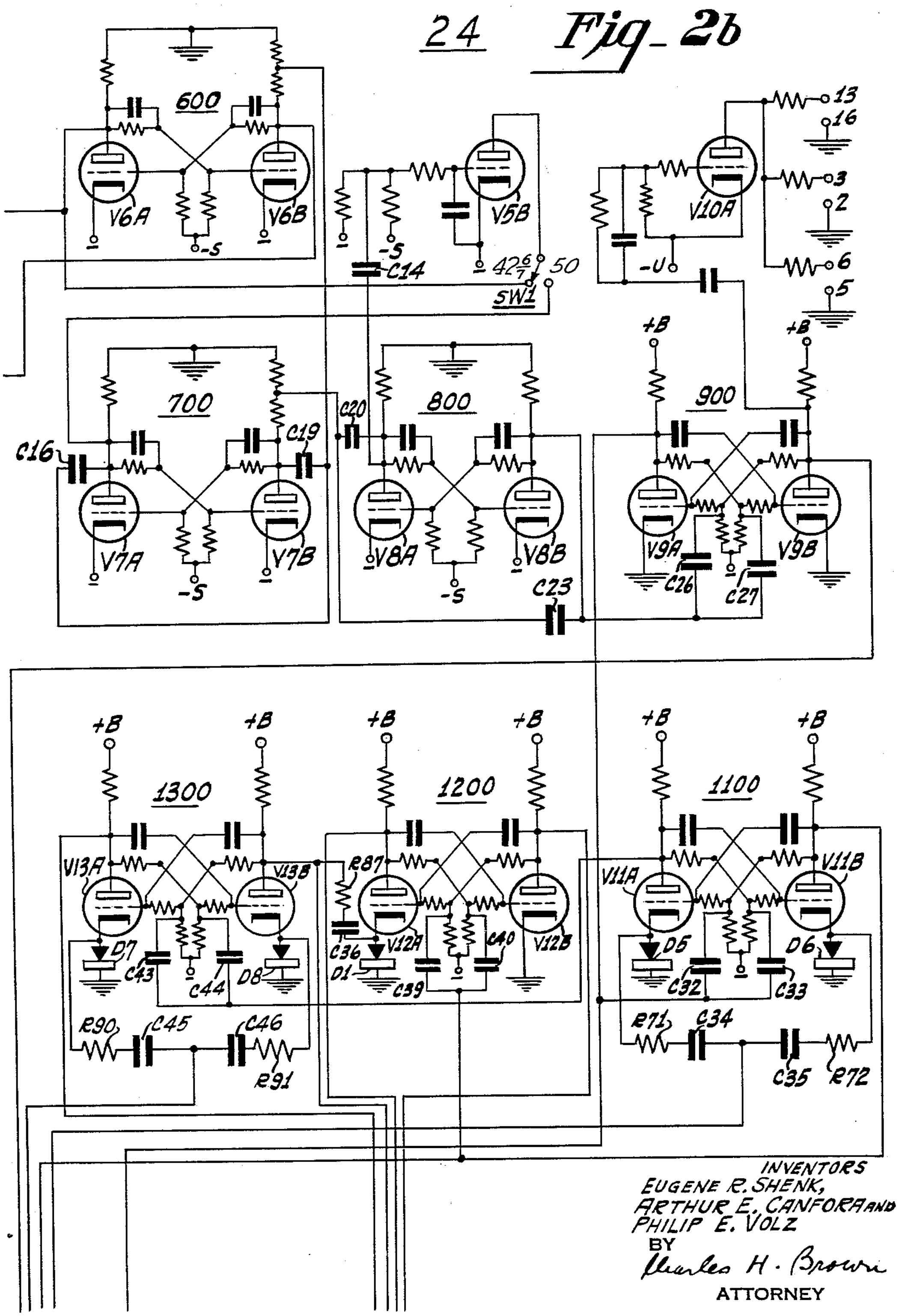
24 Fig. 2b
INVENTORS
EUGENE R. SHENK,
ARTHUR E. CANFORA AND
PHILIP E. VOLZ
BY
Charles H. Brown
ATTORNEY Aug. 23, 1955 E. R. SHENK ET AL 2,716,158

ELECTRONIC RECEIVER FOR TIME DIVISION MULTIPLEX

Filed May 21, 1951 11 Sheets-Sheet 4

INVENTORS
EUGENE R. SHENK,
ARTHUR E. CANFORA AND
PHILIP E. VOLZ
BY
Charles H. Brown
ATTORNEY

ELECTRONIC RECEIVER FOR TIME DIVISION MULTIPLEX

INVENTORS
EUGENE R. SHENK,
ARTHUR E. CANFORA AND
PHILIP E. VOLZ
BY Charles H. Brown
ATTORNEY

ELECTRONIC RECEIVER FOR TIME DIVISION MULTIPLEX

Filed May 21, 1951 11 Sheets-Sheet 6

INVENTORS
EUGENE R. SHENK,
ARTHUR E. CANFORA AND
PHILIP E. VOLZ
BY
Charles H. Brown
ATTORNEY 34248
6 OF 11 SHEETS 34248
7 of 11 SHEETS INVENTORS
EUGENE R. SHENK,
ARTHUR E. CANFORA &
PHILIP E. VOLZ
BY
Charles H. Brown
ATTORNEY 3424
8 of 11 Sh.

INVENTORS
EUGENE R. SHENK,
ARTHUR E. CANFORA AND
PHILIP E. VOLZ
BY
Charles H. Brown
ATTORNEY 34248
9 of 11 SHEETS INVENTORS
EUGENE R SHENK,
ARTHUR E. CANFORA &
PHILIP E. VOLZ
BY
Charles H. Brown
ATTORNEY 34248
10 of 11 SHEETS INVENTORS
EUGENE R. SHENK,
ARTHUR E. CANFORA AND
PHILIP E. VOLZ
BY
Charles H. Brown
ATTORNEY

ELECTRONIC RECEIVER FOR TIME DIVISION MULTIPLEX 34248
11 of 11 SHEETS

INVENTORS
EUGENE R. SHENK,
ARTHUR E. CANFORA AND
PHILIP E. VOLZ
BY
Charles H. Brown
ATTORNEY United States Patent Office 2,716,158

Patented Aug. 23, 1955

2,716,158

ELECTRONIC RECEIVER FOR TIME DIVISION MULTIPLEX

Eugene Richard Shenk, Fairlawn, N. J., Arthur Eugene Canfora, Brooklyn, N. Y., and Philip Eckert Volz, Florham Park, N. J., assignors to Radio Corporation of America, a corporation of Delaware Application May 21, 1951, Serial No. 227,344

20 Claims. (Cl. 178—50)

The invention relates to systems for multiplexing a plurality of signals on a time division basis, and it particularly pertains to an electronic receiver arrangement for separating elements of a composite signal train into individual signal trains.

In the time division multiplexing art, individual elements obtained from a plurality of trains of signal elements are sequentially assigned to a common transmission medium, or obtained from a common transmission medium and sequentially assigned to different utilization devices in predetermined order. The first process is known in the telegraphic multiplexing art as "aggregating" and the latter as "channelizing." The order in which the elements are assigned is termed the "aggregation." The shortest signal element of the composite signal train is termed the "aggregate signal element" and the shortest signal element of each channel is termed the "channel signal element."

Heretofore, the aggregation of telegraph signals for multiplex operation has been largely done electromechanically. One such system is described in an article appearing in the Proceedings of the IRE for January 1938, entitled, "Time-Division Multiplex in Radio-Telegraphic Practice," by Messrs. J. L. Callahan, R. E. Mathes and A. Kahn. Such systems require motors, commutators, brushes and the like, which systems are disadvantageous in that a large degree of maintenance is necessary to insure proper operation at all times. These disadvantages are obviated by an electronic multiplex transmitter circuit arrangement shown and described in copending U. S. patent application Serial No. 211,272, filed February 16, 1951 of E. R. Shenk, A. Liguori and A. E. Canfora, now Patent No. 2,671,132.

Heretofore, receiving equipment for long distance time division multiplex signalling also has been partially mechanical in nature, including electric motors, mechanical commutators or distributors, relays, etc. One example is that described in U. S. Patent 1,979,484 to R. E. Mathes. Another example is that of U. S. Patent 2,010,505 to Callahan, Mathes and Kahn. The electromechanical receiver has many disadvantages. The mechanical commutator, and electric motor maintenance is as expensive and disturbing a problem as that for the electromechanical transmitter. The physical size and power consumption is greater than is desired, and the operating techniques are much too complex.

It is an object of the invention to provide an improved electronic circuit arrangement for channelizing time division multiplex telegraph or other similar signals.

It is another object of the invention to provide a simplified electronic circuit arrangement for channelizing time division multiplex telegraph or similar signals of different aggregations.

It is a further object of the invention to provide an improved electronic multiplex receiving circuit arrangement enabling interchannel phasing in a simple and accurate manner.

It is still another object of the invention to provide an electronic circuit incorporating simplified means to compensate for changes in input signal level, such, for example, as the slow fading of signals.

It is a specific object of the invention to provide an improved all-electronic circuit arrangement for selecting the individual elements from an applied train of aggregated signal elements and assigning them in predetermined order into a plurality of trains of signal elements.

It is a more specific object of the invention to provide an improved and simplified electronic circuit arrangement for selecting the individual elements of a plurality of trains of telegraph signals assigned to a common transmission medium in predetermined order of said trains and separate them into channels corresponding to said plurality of signal trains.

The foregoing objects of the invention are attained in an electronic unit arranged to receive a time division multiplex signal from a source, such as a tone signal converter in which the received signals are rectified, threshholded and limited, or other form of receiving component producing a keyed D.-C. intelligence signal. A pulse is derived from the start of each marking signal element and the resultant pulse train compared for phase-correcting purposes with the result of a reference frequency wave which is multiplied and divided to derive a frequency corresponding to the signal element rate. The phase of this basic time element rate frequency wave is then compared with the phase of the train of start-of-mark pulses derived from the incoming signal. The output of the foregoing phase detector portion of the circuit is applied by way of a phase shifting circuit to advance or retard the reference frequency wave in order to maintain it in phase with the incoming signal.

The corrected locally-generated frequency wave which is produced as described above is divided to obtain a number of frequencies which are applied to the channelizing and regenerating portions of the circuit to perform the reading and channelizing functions. The aggregate signal elements are interpreted as either mark or space and regenerated into a single channel signal element of corresponding polarity. This is accomplished by gating pulse trains obtained by differentiating timing waves of aggregate and channel signal element rate in accordance with the received multiplex signal train. A basic channel time element has a time duration four times that of a basic aggregate time element. A plurality of such regenerators, arranged to be actuated in proper time sequence, are provided for regenerating the channel signals and an aggregate signal regenerator is also included for applications employing auxiliary diplex distribution equipment.

The equipment will automatically provide phase alignment with respect to the signal and means are provided to manually shift the local phase along in aggregate signal element steps until proper channel alignment is obtained.

While the receiver according to the invention was designed for use in a communications system incorporating the aforesaid electronic transmitter, it is by no means limited solely to such systems but may be used in any multiplex signalling system.

The invention will be described in greater detail with reference to the accompanying drawing forming a part of the specification and in which:

Fig. 1 is a functional diagram of an electronic multiplex receiver according to the invention;

Fig. 2 (Figs. 2*a*, 2*b*, 2*c* and 2*d* being taken together) is a schematic diagram of a multiplex receiver according to the invention;

Figure 2A:
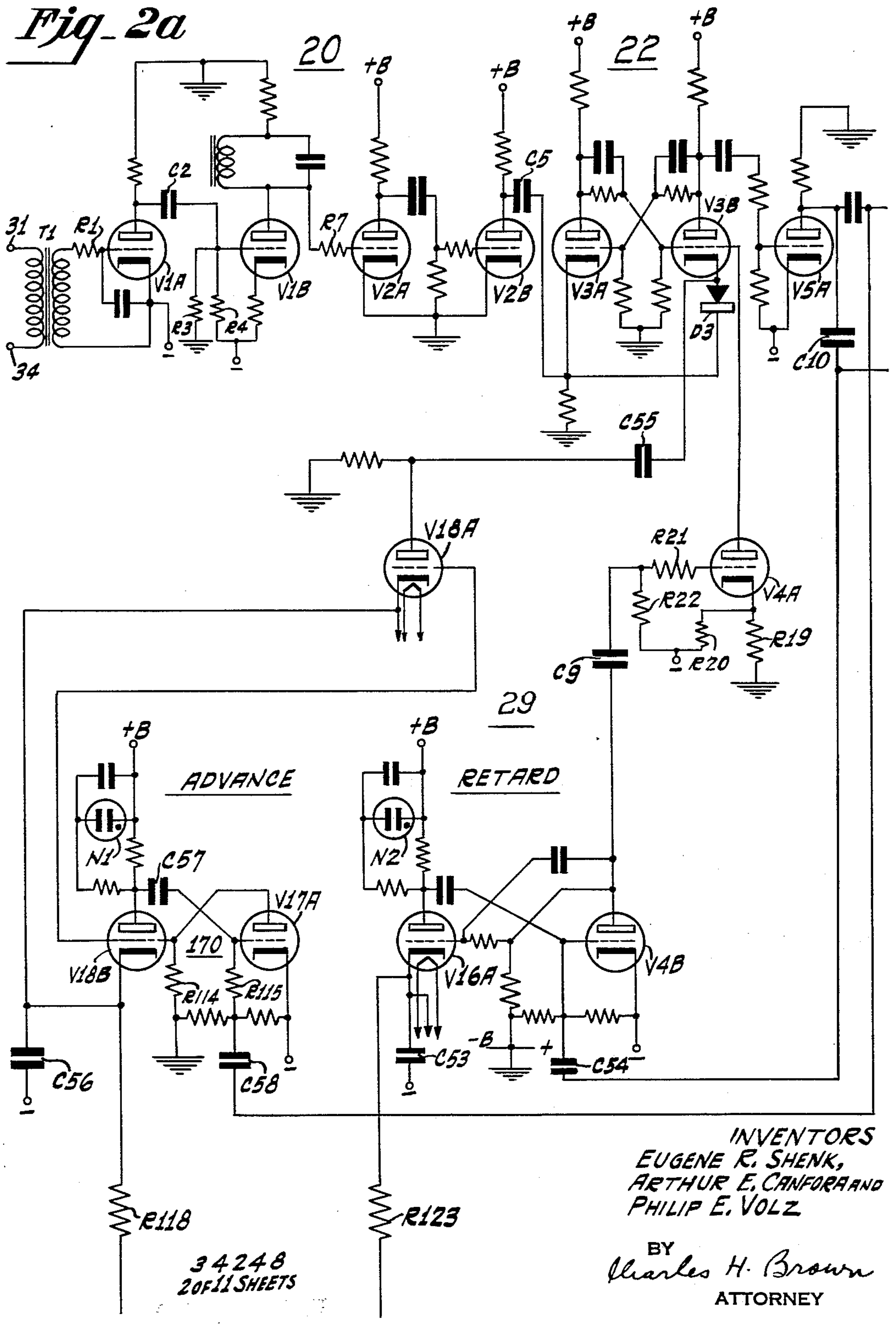

Referring to Fig. 1, there is shown a functional diagram of an electronic multiplex receiver according to the invention. A harmonic amplifier, shown here as a quadrupler and limiter circuit 20 to which a standard frequency wave is applied, develops a square wave voltage which is applied to the synchronizing section 22 forming an input circuit of a frequency divider chain 24 which is employed to develop timing waves of different frequencies. One such timing wave is applied to a phase splitting circuit 26 in order to provide a reference wave for the operation of a phase detector 28. An aggregate tone time division multiplex signal is applied to a tone signal converter 30 in which the signal is amplified, automatically threshholded and limited, rectified and delivered at the output terminals as an aggregate D.-C. time division multiplex signal. Alternately, such an aggregate D.-C. signal from a source other than a tone signal transmitter can be utilized in the following stages of the receiver as indicated by the switch in the tone signal converter output line. The D.-C. signal is applied to a phase detector 28 where a pulse is derived for each start-of-mark signal element and resultant pulse train compared to the timing wave obtained from phase splitter 26. Voltages resulting from this comparison are applied to a phase shifter 29 which in turn develops correction potentials to be applied to synchronizing section 22 to adjust the phase of the timing waves generated by frequency divider chain 24 into proper phase relationship with the incoming signal train.

The desired channel signal elements are obtained from a plurality of signal regenerator circuits 32, 34, 36 and 38 under control of a plurality of channel gating circuits 42, 44, 46 and 48 through which the pulses corresponding to signal elements pass under control of a signal gating circuit 52 to which the incoming aggregate signal element train is applied from a tone signal converter 30 or other D.-C. signal source. A train of pulses at aggregate signal element rate obtained by differentiating a timing wave obtained from frequency divider chain 24 is applied to signal gate circuit 52. Gate circuit 52 is controlled by the incoming D.-C. signal train to pass pulses only when signal elements of one desired nature are received. Usually marking signal elements are made to pass pulses and spacing signal elements are made to block gate circuit 52 but the circuit may be made to operate in an inverse manner if desired. Pulses passed by gate circuit 52 are applied to the channel gate circuits 42, 44, 46 and 48, causing them to be blocked. Other pulses at channel signal element rate obtained by differentiating other timing waves from frequency divider chain 24 are applied to the channel gate and signal regenerator circuits in such phase relationship that but one channel gate and its associated signal regenerator are operative at any one time. The pulses applied to the signal regenerator directly tend to trigger the regenerator to produce an output channel signal element of one nature. The pulses applied to the corresponding channel gate circuit will, if passed by the gate, trigger the associated regenerator to produce an output channel signal element of the opposite nature. In order to insure that the regenerator will be properly triggered, the pulse applied from the associated gate circuit is prolonged beyond that applied directly to the regenerator. This is accomplished by proper choice of the circuit component values. Thus a spacing signal element applied to gate 52 will not block the channel gate and a pulse obtained from this channel gate will trigger the one readied regenerator circuit to produce an output channel signal element corresponding to the incoming spacing signal element. A marking signal element will operate gate 52 to pass an applied pulse to all of the channel gate circuits 32, 34, 36 and 38 blocking them. Timing pulses obtained from frequency divider chain 24 will ready one channel gate and regenerator circuit for operation. The pulse applied to the channel gates will be blocked and thus the pulse applied directly to the signal regenerator will trigger the signal regenerator circuit to produce an output channel signal element corresponding to the incoming mark signal element. By taking the output of the regenerators at different points, spacing and marking output signal elements may be obtained in response to received spacing and marking signal elements or spacing and marking output elements may be obtained in response to received marking and spacing signal elements. In conventional practice, half of the multiplex channels will be operated one way and half the other. This will provide reversals useful for synchronizing purposes even when all of the individual channels are idling. A channel phasing circuit 54 is provided to produce a change in phase of a portion of frequency divider chain 24 which supplies timing waves for the operation of gates 32—38 and regenerators 42—48 so that the individual signal elements of the aggregate signal are assigned to the proper channels. An additional gate 50 and regenerator 40 are arranged to regenerate the incoming aggregate signal train obtained from signal gate circuit 52 for diplex purposes. This gate and regenerator operate the same as the channel gate and regenerator combinations except that the latter operate at channel element rate and the former operates at aggregate signal element rate and responds to all signal elements.

TONE SIGNAL CONVERTER

Figure 2C:
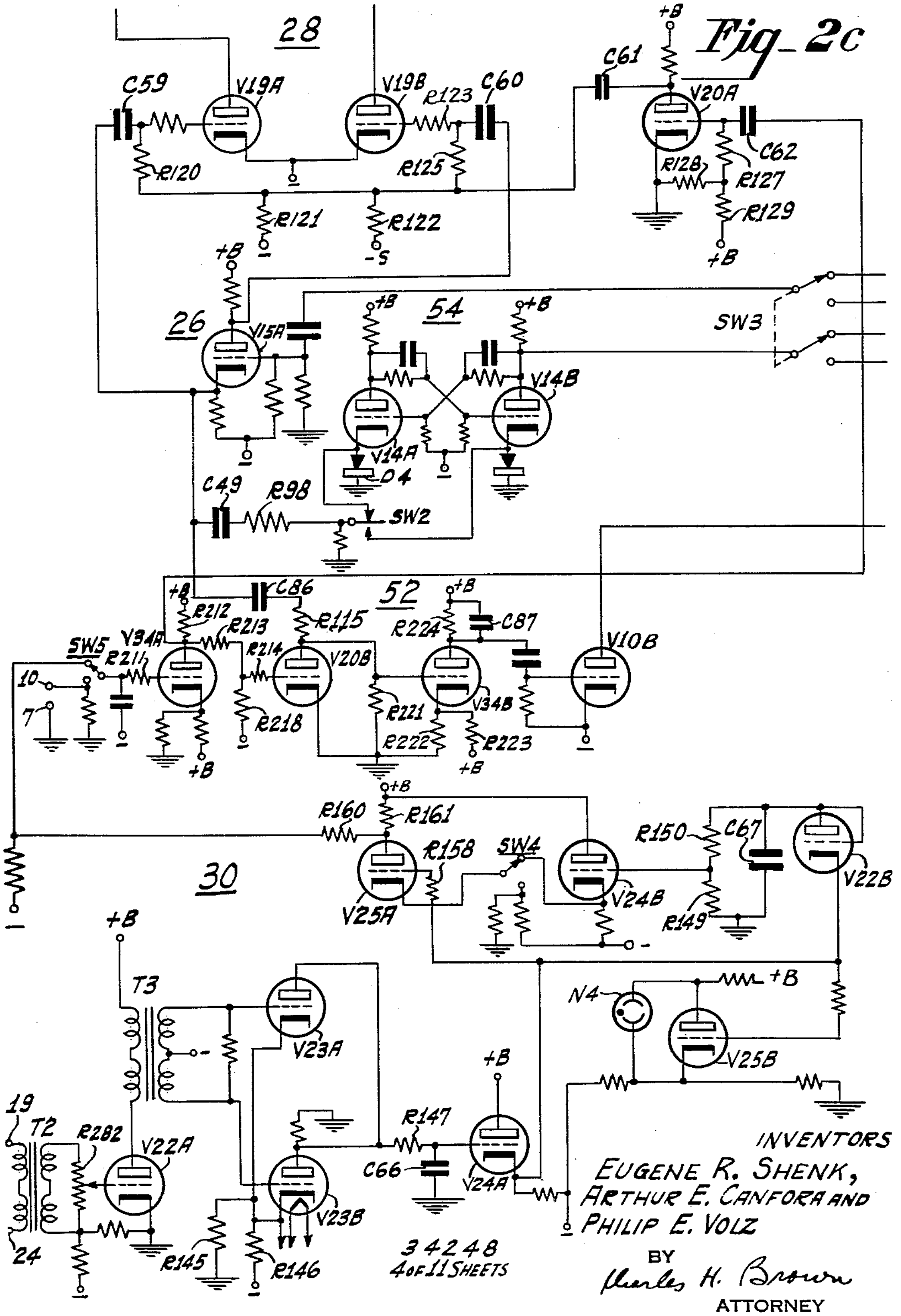
Figures 3, 5, 6:
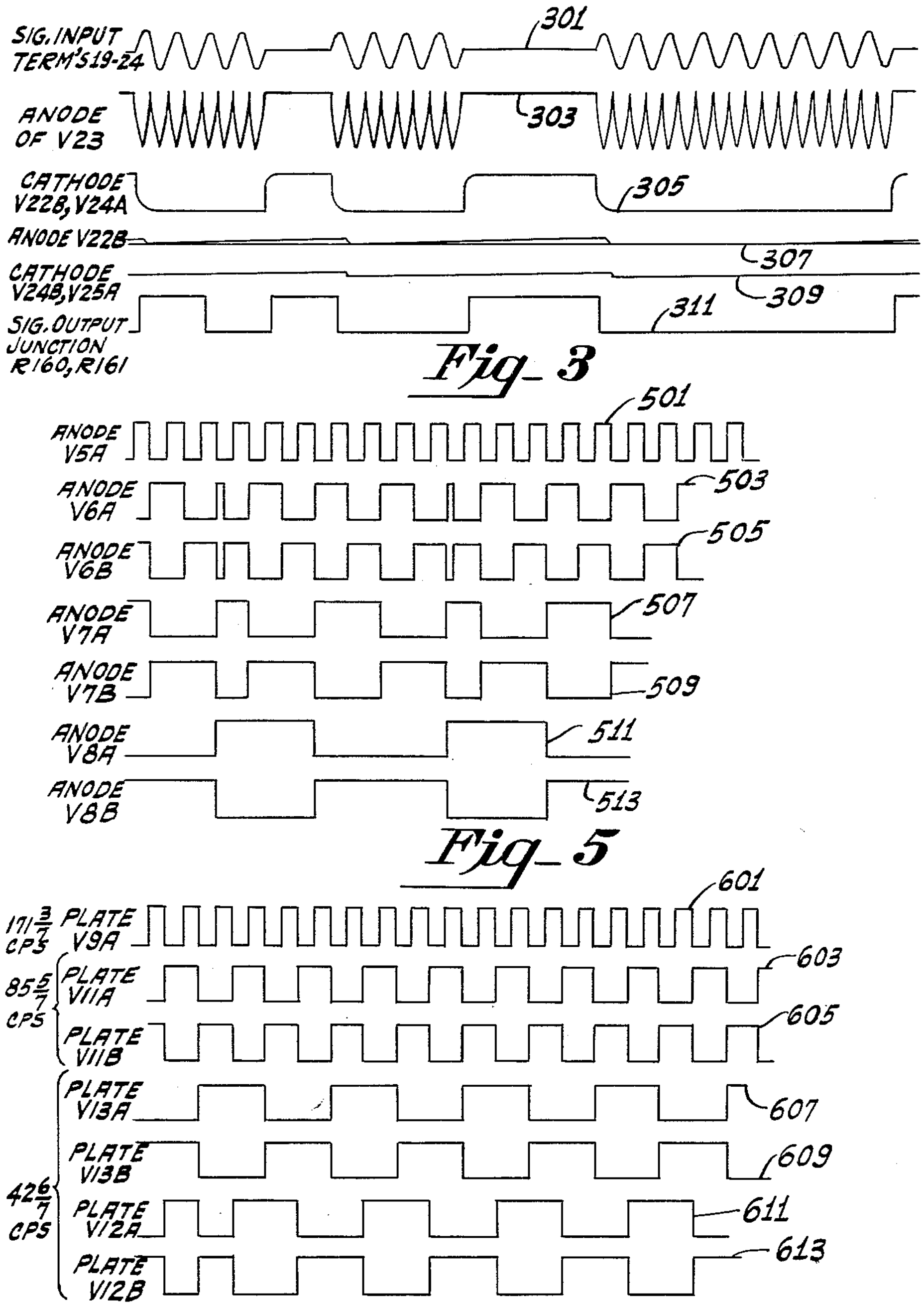
Fig. 3 is a graphical representation of the phase relationship between various electric waves occuring in a tone signal converter of a receiver according to the invention.
Fig. 5 is a graphical representation of the phase relationship between the several timing wave voltages generated for the operation of an electronic multiplex receiver according to the invention.
Fig. 6 is a graphical representation of the sequence interlocking of timing waves generated in the operation of an electronic multiplex receiver according to the invention.

Referring to Fig. 2*c*, there is shown a circuit of a tone signal converter 30 to which a keyed tone aggregate multiplex signal may be applied. The signal is amplified, rectified and automatically limited and threshholded in the converter and a keyed D.-C. signal is obtained at the output thereof. Alternately, however, any keyed D.-C. signal available may be applied to the receiver if desired, the selection being conveniently made by operation of a switch SW5. The aggregate keyed tone signal is applied to terminals 19—24 of an input transformer T2. A signal level control potentiometer R282 is connected across the secondary winding of transformer T2; the output of the signal level control is connected to the grid of vacuum tube V22A which is operated as a class A amplifier. This signal level is represented by curve 301 of Fig. 3. A transformer T3 is connected in the anode circuit of tube V22A. A push-pull aggregate keyed tone appears on the secondary winding of transformer T3. The keyed tone at the secondary winding of T3 has the same waveshape as that applied to the input terminals. Fig. 3 is a graphical representation of the waveshapes at various points in the tone signal converter circuit. The cathodes of signal rectifier tubes V23A and V23B are made positive with respect to the grid returns, that is, at the center tap of the secondary winding of transformer T3, by resistors R145, R146, and this bias is sufficient to block tubes V23A and V23B in the absence of tone signal. Due to this bias arrangement and the push-pull signal voltage, tubes V23A and V23B will conduct on alternate half-cycles when a tone is present. During tone input, therefore, the anode voltage of tubes V23A and V23B is a full-wave rectified voltage, negative with respect to ground, as shown by curve 303 of Fig. 3. This rectified voltage is filtered by the RC combination of resistor R147 and capacitor C66 and applied to the grid of tube V24A. Tube V24A is operated as a cathode follower and therefore the cathodes of tubes V24A and V22B are essentially at the same potential as the grid of input tube V24A as shown by curve 305 of Fig. 3. This potential is a keyed D.-C. signal which is approximately zero on spacing signal elements and is negative on marking signal elements. During marking periods, diode V22B will conduct and due to the arrangement of the charge and discharge time constants a capacitor C67 becomes charged to the voltage appearing on the cathode of tube V22B on marking signal elements. Curve 307 shows the potential on diode V22B. Half of the negative D.-C. voltage across capacitor C67 is applied from a voltage divider comprising resistors R149, R150 to the grid of tube V24B. Tube V24B is operated as a cathode follower so that the cathode voltage, shown by curve 309, is essentially one-half the voltage across capacitor C67. Tube V25A is an output tube having the cathode connected for automatic threshholding to the cathode of tube V24B. The grid of tube V25A is connected through a limiting resistor R158 to the cathode of tube V24A. Therefore, the grid supply voltage of the output tube is the keyed D.-C. signal while the cathode voltage of the output tube is a D.-C. voltage of amplitude equal to one-half the peak keyed D.-C. signal. As previously shown, the keyed D.-C. signal at the cathode of tubes V22B, V24A is zero on space and negative on mark. The output of tube V25A is therefore positive on mark and negative on space, as is represented by curve 311 of Fig. 3. For all practical purposes, the rise time and fall time of the filtered keyed D.-C. signal at the grid of tube V24A are equal. Since the cathode voltage of tube V25A is held at a D.-C. value equal to half the signal amplitude, the output signal weight will be independent of keyed tone signal input level changes. In other words, the weight of the keyed D.-C. output signal is the same regardless of the level of the keyed tone input signal. Also, over a certain range of input signal level, the D.-C. voltage on the cathode of tube V25A is always one-half of the keyed D.-C. signal amplitude of the grid supply voltage. Therefore, over this range of input signal levels, the output for mark will be a certain plus voltage, the output for space will be a negative voltage, and the signal weight will be independent of the input signal level. This is true so long as changes in signal level occur at a slow enough rate so that the peak rectifier tube V22B and capacitor C67 can follow these changes. In other words, automatic compensation for level changes such as slow fades is obtained with this arrangement. A fixed cathode potential and a grid supply voltage which is the keyed D.-C. signal are applied to an indicator tube V25B. The anode circuit contains a neon lamp N4. The voltages are so chosen that the signal input level applied to tube V22A is in the center of the above-mentioned operating range when the setting of potentiometer R282 is such that neon lamp N4 just lights. If the signal level is too high, neon lamp N4 will glow continuously and if the level is too low, the lamp will not glow at all. The effective input level may be changed by adjusting potentiometer R282. The circuit of an indicator tube V25B, together with neon indicator N4, provides setting the signal level control so that normal operation will be in the center of the automatic control range. A switch SW4 is provided in the cathode circuit of V25A for selective switching from the cathode of tube V24B to a fixed threshholding voltage. In this case, the operation is entirely manual, but the bias on tube V25A is so chosen that neon indicator N4 operates as before to show the proper setting of the signal level adjustment potentiometer R282. In the manual control position, the output weight is controlled by the setting of potentiometer R282 and is not independent of input signal level changes. The keyed D.-C. output from tone signal converter 30 appears at the junction of limiting resistor R160, an output load resistor R161, and this is connected to a switch SW5 which permits selection of a signal from the tone signal converter section 30 or from any available keyed D.-C. signal applied to terminals 10 and 7 as desired.

TIMING WAVE GENERATION

At this point, the incoming multiplex telegraph signal is in direct mark-space current form at a repetition rate determined by the transmitter. Timing waves required for operation on the incoming signal are generated locally by a 600 cycles per second standard frequency generator and synchronized with the incoming signal. Referring to Fig. 2*a*, the standard frequency wave, preferably 600 C. P. S., is applied to a harmonic amplifier quadrupler circuit in the case of 600 C. P. S. input, the 2400 C. P. S. output wave of which is applied to a limiter comprising tubes V2A and V2B. The standard frequency wave is usually a sine wave and is shown as such on the waveforms in Fig. 4; however, this is not essential to the proper operation of the circuit and the standard frequency input may be almost anything between a square wave and a sine wave. As shown in Fig. 2*a*, the standard frequency reference wave input is a 600 C. P. S. sine wave applied to the primary winding of a transformer T1 at terminals 31 and 34. An example of such a wave is represented by curve 401 of Fig. 4. A 600 C. P. S. sine wave of larger amplitude appears across the secondary winding of transformer T1 and is applied to the grid of a tube V1A through a resistor R1. The quadrupler circuit will operate properly over a large range of standard frequency input amplitude. The grid of tube V1A cannot be driven positive to any great extent because of the action of resistor R1. Tube V1A will be blocked on the negative swings on large levels of standard frequency input. The anode voltage on tube V1A, curve 403, Fig. 4, varies from a distorted sine wave to a square wave depending on the input level. This voltage is differentiated in the circuit constituted by capacitor C2 and associated resistors R3, R4 and applied to the grid of a tube V1B, as shown by curve 405. Tube V1B is operated as a class C amplifier and has an anode circuit tuned to 2400 C. P. S. The voltage on the anode of tube V1B is a damped sine wave as shown by curve 405 in Fig. 4.

Figure 4:
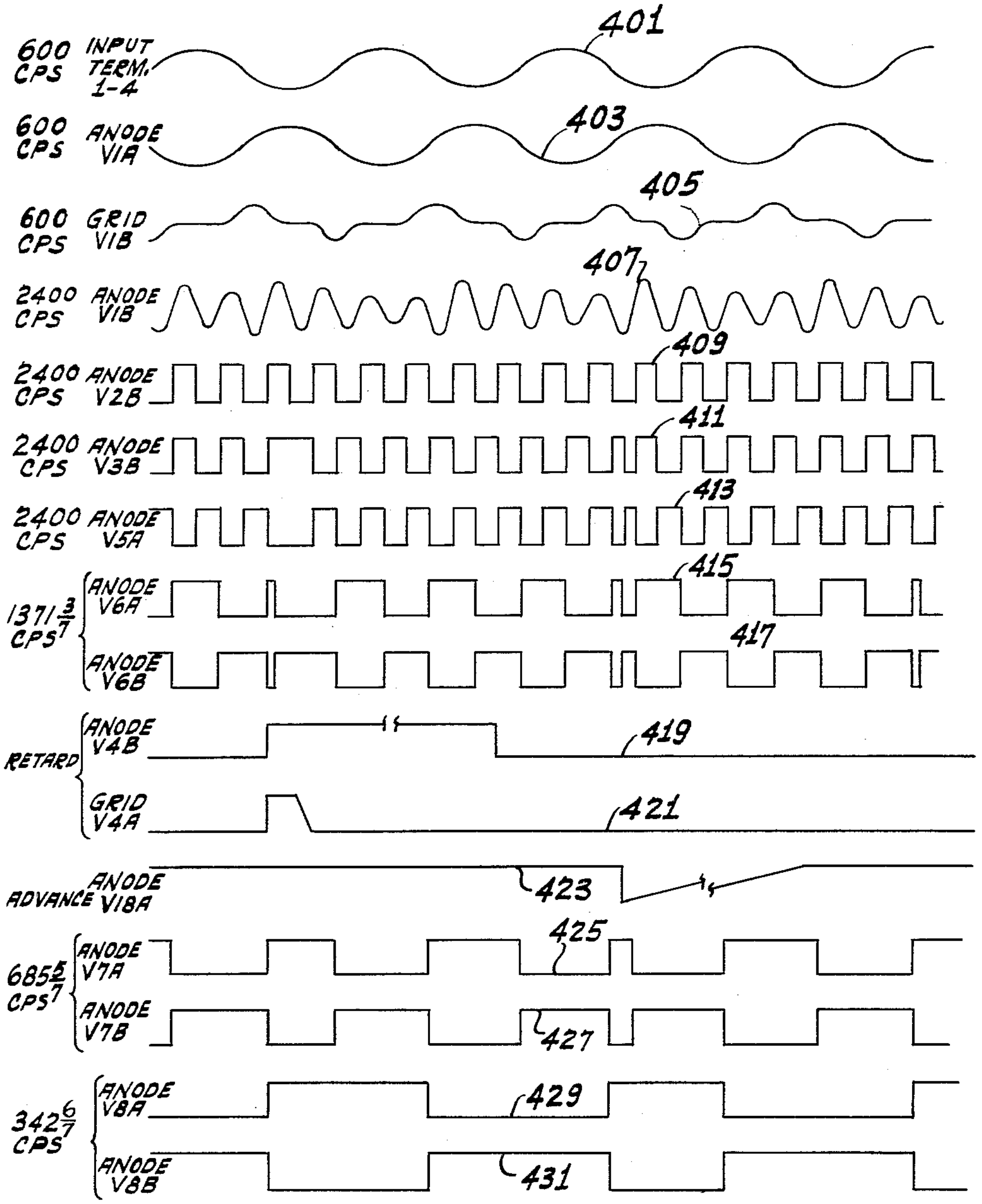
Fig. 4 is a graphical representation of the phase relationship between the several voltages generated for the operation of an electronic multiplex receiver according to the invention.

The 2400 C. P. S. damped sine wave from the anode of tube V1B forms the basic reference wave for producing all of the locally-generated timing waves necessary for the operation of the receiver. Assuming operation of the circuits without any correction for synchronization between the reference wave and the incoming signal wave, the 2400 C. P. S. wave is applied through a resistor R7 to the grid of a tube V2A, connected with another tube V2B as a two-stage limiter. A 2400 C. P. S. square wave as shown by curve 409 is produced at the anode of tube V2B. This square wave is differentiated by capacitor C5 and applied to the cathodes of tubes V3A and V3B. The latter are connected in one form of well-known flip-flop circuit or bistable multivibrator circuit 22. Circuit 22 is used in conjunction with correcting pulses obtained from phase detecting and shifting circuits to produce a phase shift in the standard frequency to synchronize the timing waves with incoming signal for proper operation of the circuit as will be described hereinafter. The amplitude of the wave obtained from tube V2B and the synchronizing circuit components are of such value that synchronizing circuit 22 divides by one. That is, the output frequency of circuit 22 is the same as the input frequency, namely 2400 C. P. S. The 2400 C. P. S. square wave at the anode of tube V3B, shown by curve 411, is coupled to the grid of an isolator tube V5A. The signal from tube V3B is inverted by tube V5A, but the main purpose of the latter tube is to isolate circuit 22 from the following circuit 600, shown in Fig. 2*b*. A 2400 C. P. S. square wave, represented by curve 413, is produced at the anode of tube V5A. The waveforms in this part of the circuit are shown in Fig. 4. For the present, those places where the anode of tube V5A exhibits an abnormally long or short cycle should be disregarded. These cases will be explained more fully hereinafter. Multivibrator circuits 600, 700 and 800 have input waves of amplitudes and component values so adjusted that each circuit alone would divide by two, that is, the output wave of each circuit alone would have a frequency of one-half of that of the input wave. Such circuits are well known and are commonly called binary divider circuits. Binary divider circuits 600, 700 and 800 together with a reset tube V5B constitute a frequency divider, which may be set by operation of a switch SW1 to provide frequency division by a factor of 6 or 7 overall. That is, depending on the position of SW1, the output wave of circuit 800 will have either 1/6 or 1/7 of the frequency of the input wave which is nominally 2400 C. P. S. This allows the equipment to operate with either of two signal element rate signals. The output of circuit 600 is applied to circuit 700 through capacitors C16 and C19. The output of circuit 700 is applied to circuit 800 through capacitors C20 and C23. The square wave at the anode of tube V8A is differentiated by capacitor C14 and applied to the grid of reset tube V5B. The anode of the reset tube V5B is connected either to the anode of tube V6A or to the anode of tube V7A depending upon the position of switch SW1. When switch SW1 is in the position shown, corresponding to 42 6/7 speed, the reset is applied to tube V6A and the applied frequency is divided by 7. That is, the output of circuit 800 is 1/7 of 2400 C. P. S. or 342 6/7 C. P. S. When switch SW1 is in the other position, corresponding to 50 speed, the reset is applied to tube V7A and the frequency is divided by 6. That is, the output of circuit 800 is 1/6 of 2400 C. P. S. or 400 C. P. S. The waveforms appearing in this frequency divider section are shown in Fig. 5 when set for 42 6/7 speed. It should be obvious that when set for 50 speed, the curves have a similar appearance. Since the frequency is different, however, the frequency divider chain is reset at a different point, and curves reflecting that difference will be obtained.

Circuits 900, 1100, 1200 and 1300 form an additional frequency divider section. Circuits 900 and 1100 each divide by two. Circuits 1200 and 1300 also divide by two, but due to an interlock arrangement and the method of driving, the two circuits together form a four-phase generator of desired phase sequency. The four-phase output from these circuits is used for the channelizing functions in the receiver. The output of circuit 800 is coupled to circuit 900 through capacitors C26 and C27. The output of circuit 900 is coupled to circuit 1100 through capacitors C32 and C33. The output of tube V11A is coupled to circuit 1300 through capacitors C43 and C44. The output of tube V11B is coupled to circuit 1200 through capacitors C39 and C40. Both circuits 900 and 1100 operate as normal binaries and each divides the applied input wave by two. Circuits 1200 and 1300 each divide the applied input wave by two, and since circuits 1200 and 1300 are driven from opposite phase outputs of circuit 1100, the outputs of circuits 1200 and 1300 are both one-half the output frequency of circuit 1100. However, the relative phase between the output of circuit 1200 and the output of circuit 1300 must be 90 degrees. Since circuits 1200 and 1300 each provide two output voltages 180 degrees apart, the system comprising circuits 1200 and 1300 produces four voltages spaced 90 degrees apart in a four-phase system. However, in the absence of any locking between circuits 1200 and 1300, the phase sequence of this four-phase system would depend only upon the manner in which each circuit happened to start. Obviously, if these four-phase voltages are to be used for channelizing purposes, there must be a known and constant phase sequence. This known and constant phase sequence is accomplished by properly interlocking circuit 1200 to circuit 1300 over the path containing resistor R87, capacitor C36 and the diode D1 in the cathode circuit of tube V12A. A positive transition at the anode of tube V13B is applied to the cathode of tube V12A but due to the polarity of the diode D1, the diode conducts and the resulting positive pulse across diode D1 has no effect on circuit 1200 regardless of which tube in this binary circuit is conducting. A negative transition at the anode of tube V13B is applied to the cathode of tube V12A. If tube V12A is blocked at this time, a negative pulse of large amplitude will appear across the diode D1 and this will cause the circuit to trip to the condition where tube V12A is conducting. If tube V12A is conducting at the time the anode of tube V13B goes through a negative transition, the negative pulse appearing across the diode D1 will be small since the diode resistance is now low due to the current through it which is the anode current of tube V12A. The interlock, therefore, operates to insure that tube V12A is conducting when a negative transition occurs at the anode of tube V13B. The waveforms occurring in this portion of the frequency divider section are shown in Fig. 6. The operation and waveforms are the same regardless of the speed setting of switch SW1. Curves 611 and 613 show the phase lock operating.

The output of tube V9B is applied to the grid of tube V10A. The anode output of tube V10A is distributed to three pairs of terminals 2, 3; 5, 6; and 13, 16. These outputs are 171 3/7 C. P. S. or 200 C. P. S. depending on the position of speed switch SW1. These outputs are corrected standard frequency and are used for synchronizing auxiliary equipment such as multiplex transmitters and diplex receivers.

A portion of the keyed D.-C. signal may be extracted from the anode circuit of tube V34A, Fig. 2*c*, and applied to the grid of a tube which will serve as a signal monitor amplifier. Also, a sawtooth sweep voltage of single channel signal element rate may be generated in another tube circuit and the two signals employed to check the operation of the receiver with an external oscilloscope for signal monitoring purposes. Circuits which provide a signal monitor and a sweep output are well known and are in no way essential to the multiplex receiver, but are suggested only for convenience.

SIGNAL CHANNELIZING AND REGENERATION

A signal amplifier circuit, a number of flip-flop or bistable multivibrator circuits which perform the channelizing and regenerating functions and a number of output tubes are arranged in the particular embodiment to be described to apply current in a polar manner to repeating relays. However, these output tubes could alternatively be designed to apply on-off current directly to printing telegraph equipment.

The aggregate keyed D.-C. signal, either from the output of the tone signal converter or from the D.-C. keyed input, is positive for mark, and zero or negative for space. It would still be within the principles of the invention, however, to reverse these conditions, if deemed desirable. This voltage is applied through a resistor R211 to the grid of an amplifier tube V34A, the output circuit of which is coupled to a number of circuits later to be more fully described. The aggregate signal is applied over resistors R213, R214 and R218 to the grid of a tube V20B. The waveform appearing at the grid of tube V20B is represented by curve 713. Therefore, when the input signal is on mark, tube V20B will be blocked and when the input signal is on space, tube V20B will conduct. Square waves at aggregate signal element rate frequency from the channel phasing circuits are differentiated across a capacitor C86 and applied to the anode of tube V20B through a resistor R215. The grid of tube V34B is connected to the anode of tube V20B and to ground over a resistor R221. Tube V34B is biased in the cathode circuit by action of resistors R222 and R223 so that it is normally blocked. Both positive and negative pulses can appear on the grid of tube V34B as shown by curve 715, but since this tube is normally blocked, the negative pulses never result in any output at the anode of tube V34B. If the signal is marking, tube V20B will be blocked and a positive pulse occurring during mark therefore appears on the grid of tube V34B and is amplified, producing a negative pulse at the anode of tube V34B. If the signal is space, tube V20B will conduct and a positive pulse occurring during space is very low in amplitude at the grid of tube V34B. This pulse appears across the low conducting anode resistance of tube V20B (the positive pulse during mark appears across the high resistance element R221). Therefore, a positive pulse during space produces no output at the anode of tube V34B.

Figure 7:
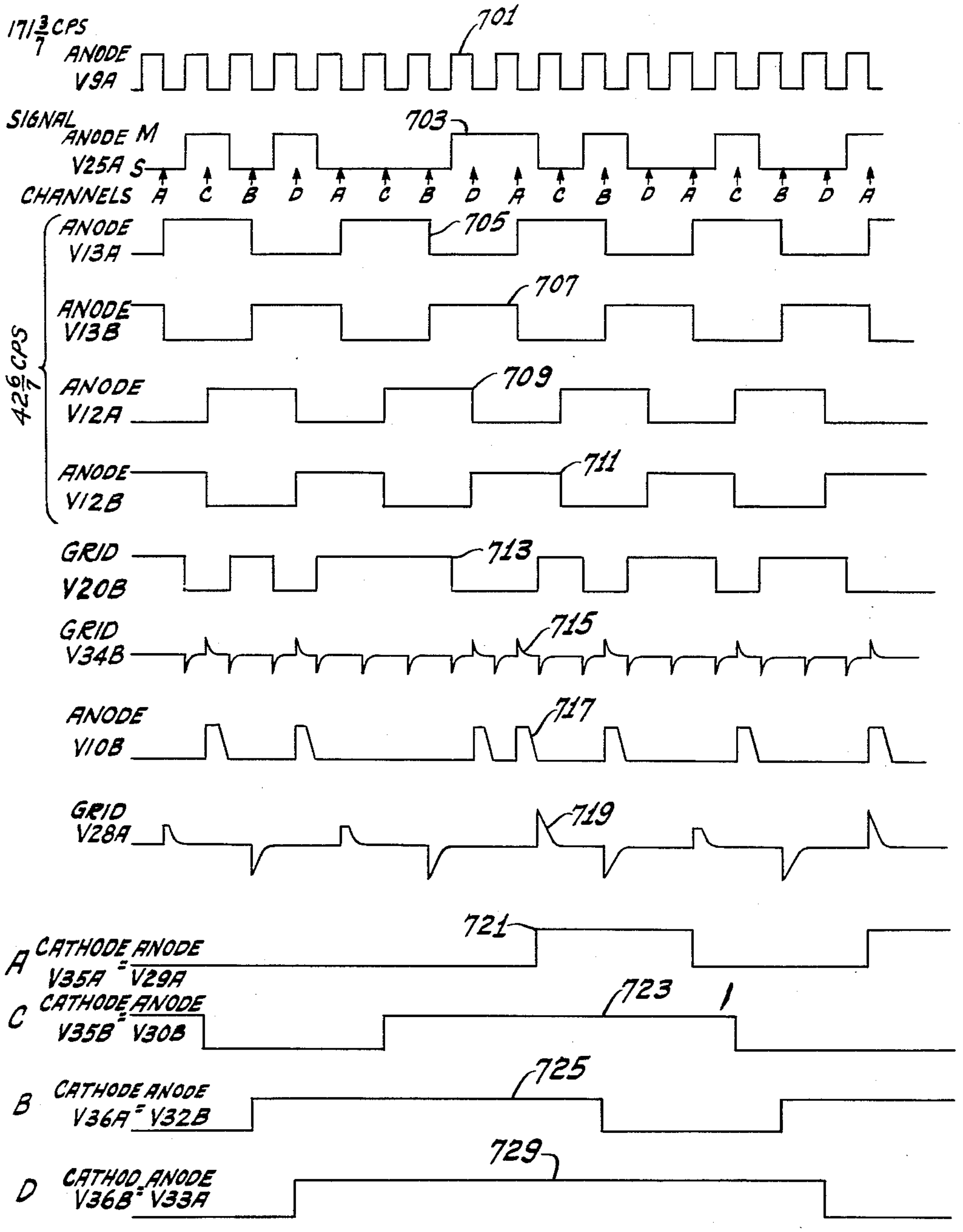
Figs. 7 and 8 are graphical representations of waveforms developed in the selector and regenerator portions of an electronic receiver according to the invention.
Figure 8:
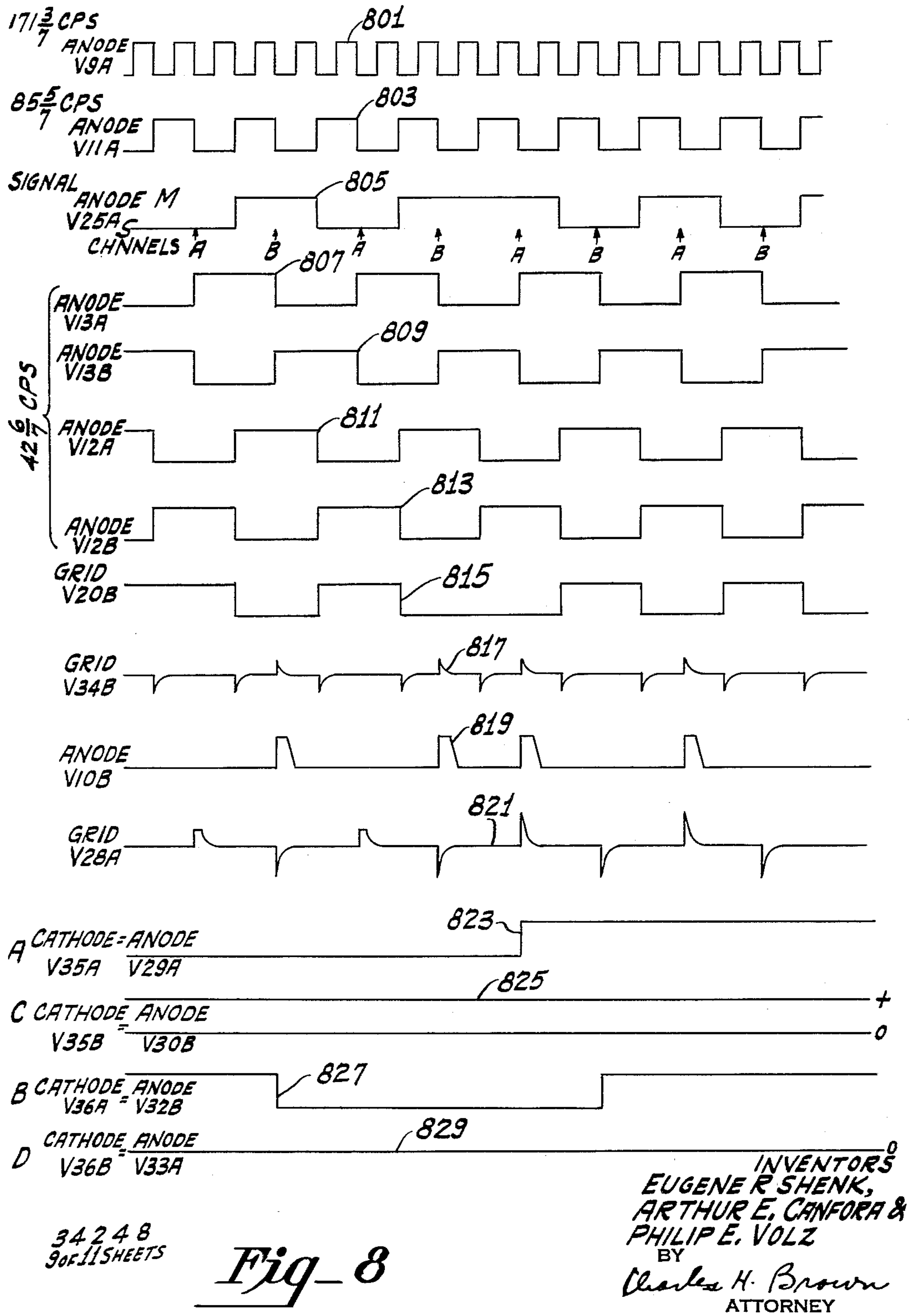

The anode circuit of tube V34B includes a resistor R224 shunted by a capacitor C87. Capacitor C87 is charged negatively through tube V34B and discharged through resistor R224. These time constants are so arranged that the pulse width produced at the anode of tube V34B is greater than the pulse width at the grid of tube V34B. The reason for this pulse stretching will be explained later. The stretched pulse appearing at the anode of tube V34B is applied to the grid of tube V10B and a stretched and clipped positive pulse is produced in the anode circuit of tube V10B as shown by curve 717. Therefore, a pulse appearing in the anode circuit of tube V10B is initiated by the local signal element frequency wave but it only appears when the aggregate signal is coincidently on mark. It will be further shown that due to the phase of the local frequency wave applied to tube V20B, in conjunction with the automatic phase alignment, the reading of the aggregate signal takes place at approximately the center of the aggregate signal element. The above description of the reading portion of the circuit is correct regardless of the speed setting of switch SW1, and the setting of switch SW3 determining the number of channels in the aggregate signal. The waveforms appearing in this portion of the circuit are shown in Figs. 7 and 8, the former referring to four-channel operation and the latter to two-channel operation.

In order to explain the operation of the multivibrator channelizing and regenerating circuits, reference will be made to the particular circuit involving a single channel. The other three channels are identical in operation except for their relative timing. The anode of tube V10B is connected to the cathodes of tubes V26, V28A, V28B, V31A and V31B and to ground through resistor R226. Normally, tube V10B is conducting and the anode thereof is slightly less negative than the minus (—) supply line. The cathode of tube V28A is slightly less negative than the minus (—) supply line and the grid of tube V28A is connected through resistors R172 and R171 to the negative voltage supply. The negative bias on the grid of tube V28A under these conditions is sufficient to block the tube. The grid of tube V28A is connected by a capacitor C73 to the anode of tube V13A. The square wave at the anode of tube V13A is differentiated in the grid circuit of tube V28A. The negative pulses in this circuit have no effect since tube V28A is already blocked as explained above. The positive pulse in the grid circuit of tube V28A from the anode of tube V13A, however, may have an effect. Under the above conditions where tube V10B is conducting (space input), a positive pulse of the type shown by curve 719 in the grid circuit of tube V28A will cause this tube to conduct. The anode of tube V28A is connected to the anode of tube V29A. Tubes V29A and V29B comprise a flip-flop or bistable multivibrator circuit. The cathode of tube V29B is connected by a capacitor C76 to the anode of tube V13B. The voltage at the anode of tube V13B as represented by curve 707, is 180 degrees out of phase with the voltage at the anode of tube V13A, as represented by curve 705, and therefore at the same time that a positive pulse is developed in the grid circuit of tube V28A from the anode of tube V13A, a negative pulse is developed in the cathode circuit of tube V29B from the anode of tube V13B. The positive pulse acting through tube V28A acts to cause tube V29A to conduct, while the negative pulse acts to cause tube V29B to conduct. Curve 721 shows the waveforms appearing at the anode of tube V29A. The pulse widths are so arranged that when both pulses are present, one always gains control of flip-flop circuit 32. The width of the pulse in the grid circuit of tube V28A is made much greater than the width of the pulse in the cathode circuit of tube V29B. Therefore, when the above conditions are met, that is, during space signal input, the pulse applied to tube V29A through tube V28A lasts longer than the pulse in the cathode of tube V29B and the former pulse gains control of circuit 32 causing tube V29A to conduct. If the above conditions are met, and tube V29A was already conducting due to a previous channel A signal being space, this tube would simply remain conducting.

If, when the previously described pair of pulses from circuit 1300 occur, the input signal is marking, circuit 32 is operated in a different manner. When mark input occurs, it was previously shown that tube V10B became blocked for a period following the reading pulse. During this period the anode of tube V10B and the cathode of tube V28A are at ground patential. The bias on tube V28A during this period is therefore the entire negative supply voltage and hence when the previously described positive pulse, represented by curve 719, occurs in the grid circuit of tube V28A, its amplitude is insufficient to cause tube V28A to conduct. Tube V28A is blocked for a sufficient time to assure that no portion of the positive grid pulse causes this tube to conduct. The pulse applied to the cathode of tube V28A is purposely made much longer than the pulse applied to its grid. This is the reason for stretching the length of the mark pulses at the anode of tube V34B as previously mentioned. No pulse is fed to tube V29A so that only the negative pulse in the cathode circuit of tube V29B can have an effect on circuit 32. This negative pulse will cause tube V29B to conduct or if tube V29B was already conducting, due to the previous channel A signal being mark, this tube would merely remain conducting. It should be mentioned that the positive pulse fed from tube V13B to the cathode of tube V29B never has any effect since it is shorted out by the diode D3 in the cathode circuit of tube V29B. The channelizing pulses fed to circuit 32 occur only at the time when the aggregate incoming signal is assigned to channel A and hence only channel A information has any effect on circuit 32. Also, since circuit 32 remains in whatever state it was left until a later channel A information changes this state, the signal at the anodes of tubes V29A and V29B is the channel A signal regenerated to full single-channel signal element lengths. It will be noted that tube V29A is left conducting when the channel A signal was space, while tube V29A was left non-conducting when the channel A signal was mark, as shown by curves 703 and 721. The condition of tube V29B is of course just the opposite of that of tube V29A. The anode of tube V29A is connected to the grid of tube V35A through a resistor R232. When tube V29A is conducting on space signal, tube V35A is blocked and when tube V29A is blocked on mark signal, tube V35A is conducting. When tube V35A is blocked, the open circuit voltage at the 5-unit channel A output terminals 8, 9 is negative and when tube V35A is conducting, this voltage is positive. A relay coil connected between this output terminal and ground will, therefore, be driven in a polar fashion, that is, current will flow through the coil in one direction for mark, and the opposite direction for space. The operation of channels C, B, and D is identical to that described except that the timing is of a different phase. The aggregate signal is a time division multiplex signal in which the aggregation, that is, the order in which the signal elements are assigned to the various signal channels is ACBDACBD. . . . Furthermore, channels A and D are direct; that is, a channel marking signal is represented by a mark in the aggregate signal; and channels C and B and inverted; that is a channel marking signal is represented by a space in the aggregate signal. The purpose of this arrangement is to insure that when all the single channels are idle, (on mark), the aggregate signal will still contain transitions which may be used at the receiver for holding phase. Since the channel B and C signals are inverted in the incoming aggregate signal, they are erected in the receiver by connecting their associated output amplifiers to the opposite sides of the regenerator circuits.

The foregoing explanation assumed a four-channel aggregate signal. If the aggregate signal is a two-channel signal, regenerators for channels A and B will give the two single channel outputs represented by curves 823 and 827 of Fig. 8, and channels C and D regenerators will remain idle at potentials shown by curves 825 and 829. A two-channel signal is aggregated with the sequence ABAB. . . . Channel A is direct and channel B is inverted and the aggregate signals elements are twice as long as the aggregate signal elements of a four-channel signal shown by curve 805. Operation of switch SW3 enables operation on either a two-or four-channel signal. The waveforms appearing in this portion of the circuit for both four-channel and two-channel operation are shown in Figs. 7 and 8 respectively.

Figure 9:
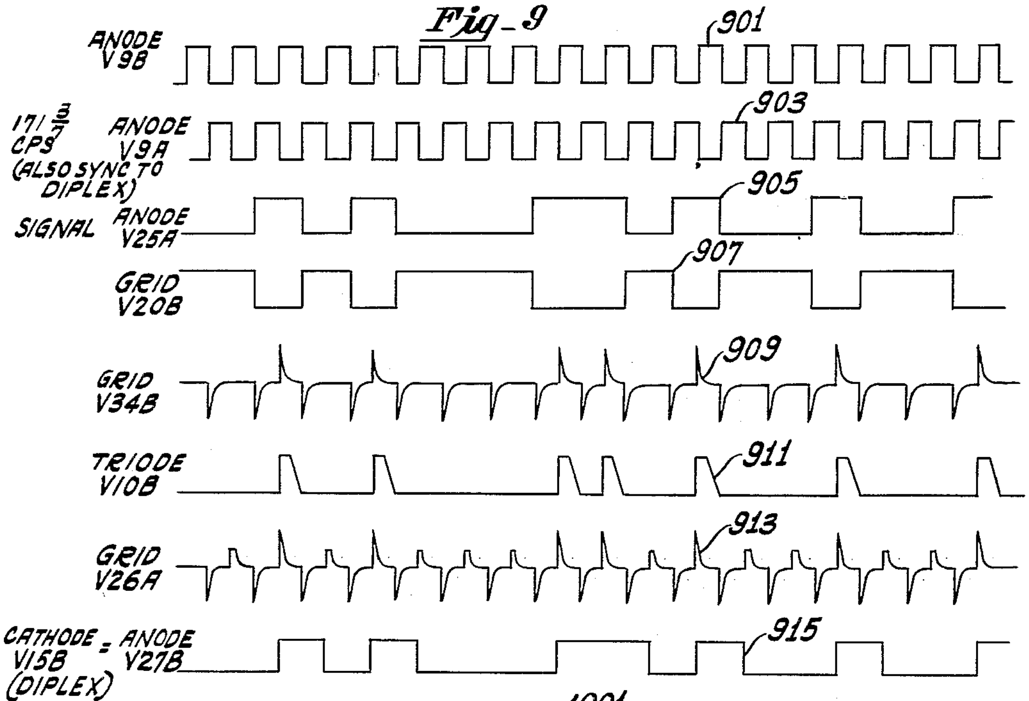
Figs. 9 and 10 are graphical representations of waveforms developed in the diplex regeneration portions of an electronic receiver according to the invention.

Aggregate signal regenerator 40 is included in the receiver according to the invention and its operation is very similar to that described for the single-channel regenerators. The output signal from regenerator 40 is used by diplex distributor equipment. The operation of aggregate regenerator 40 is identical to that of the single-channel regenerators except that the reading frequency is the aggregate signal element rate. The grid of tube V26 is connected by a capacitor C68 to the anode of tube V9B and the cathode of tube V27B is connected by a capacitor C72 to the anode of tube V9A. The output of circuit 900 is the aggregate signal element rate for a four-channel signal. The anode of tube V27A is connected by a resistor R228 to the grid of tube V15B which is the signal output tube. The two diplex outputs of waveforms represented by curve 915 are taken from the cathode of tube V15B. With a four-channel signal, the diplex output is simply the regenerated aggregate signal having at terminals 21 and 23 a positive polarity for mark and zero voltage for space. The operation of this portion of the circuit with a four-channel signal is shown by the waveforms in Fig. 9.

Figure 10:
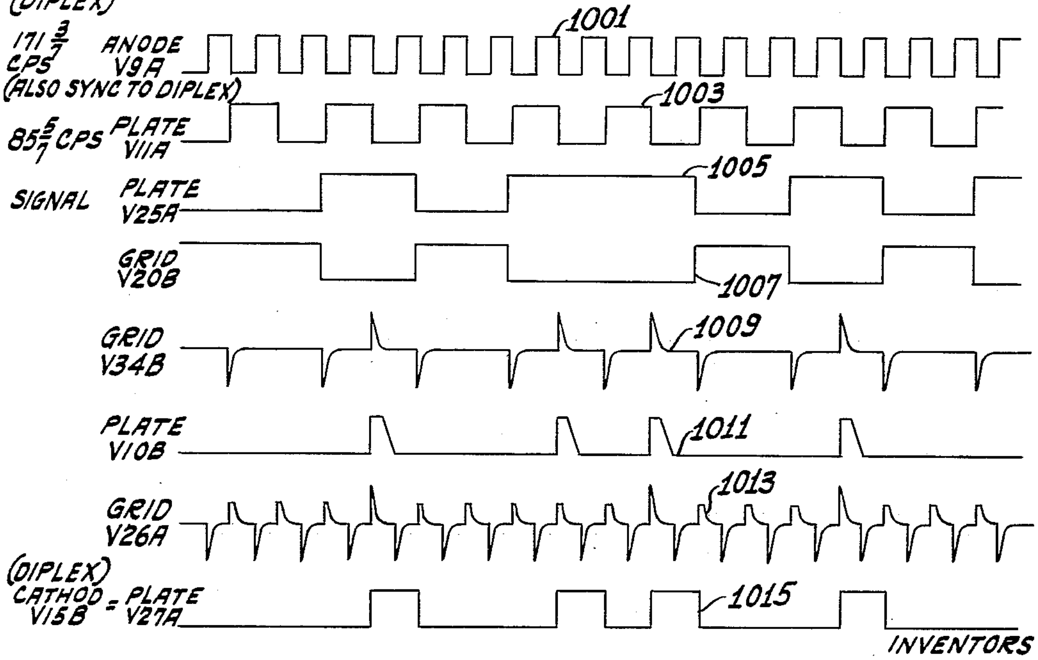

In the case of a two-channel signal, the only change is that the reading frequency applied to the anode of tube V20B, as represented by curve 1009, is made one-half that for a four-channel signal. This results in a rather special signal output from the aggregate regenerator 40. Immediately following the reading of the aggregate signal, the diplex output signal, as shown by curve 1005, will be a regenerated element of the same sense as the aggregate signal and the length of this element is one four-channel aggregate signal element. The output signal element immediately following this will be space or zero output voltage. The diplex output signal under these conditions, therefore, consists of signal elements each having a duration equal to one aggregate four-channel signal element, and every other signal element is repeating the input signal while the intervening signal elements are all spaces. The operation of this portion of the circuit with a two-channel signal is shown in Fig. 10.

PHASING CIRCUITS

Figure 11:
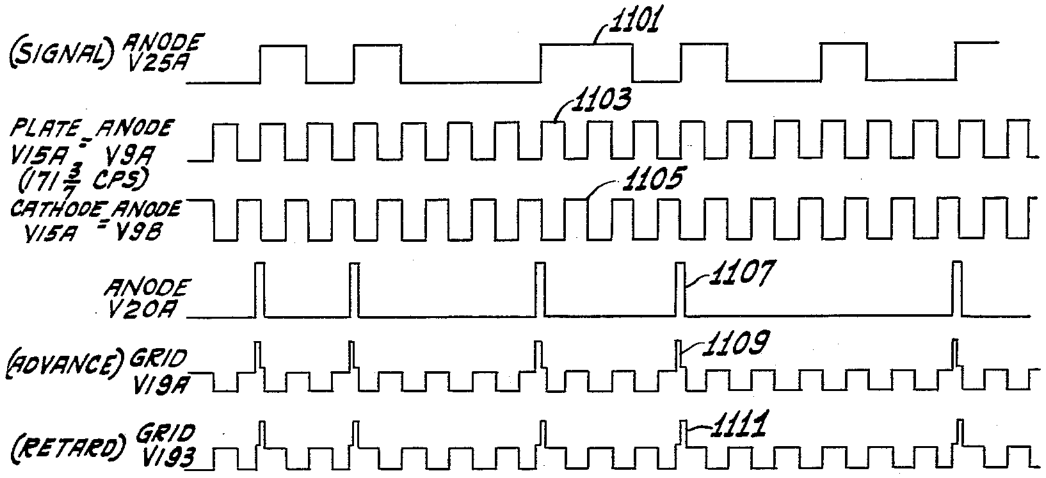
Figs. 11 and 12 are graphical representations of waveforms developed in the phase detector portions of an electronic receiver according to the invention.
Figure 12:
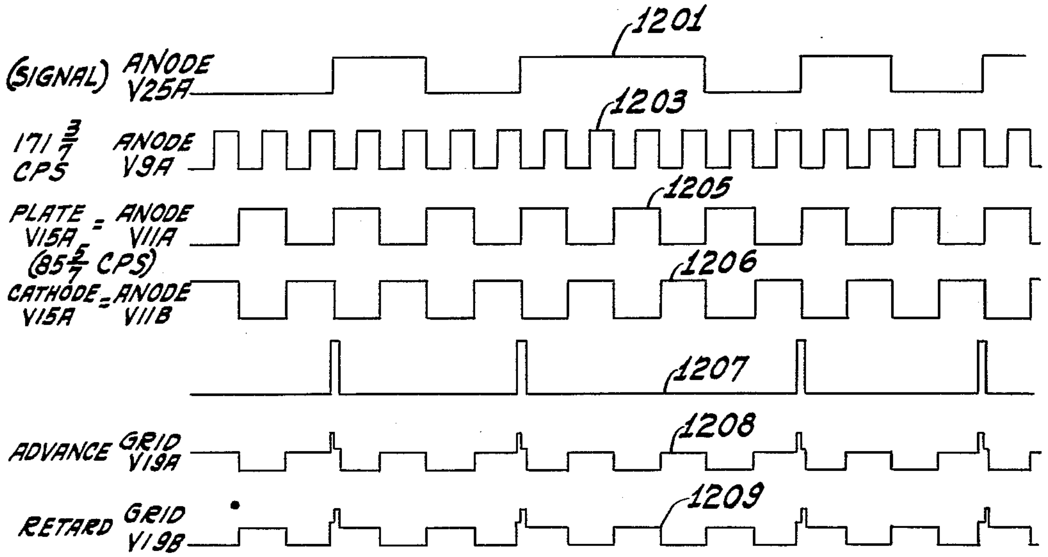

In order for the receiver to operate properly, the reading and channelizing functions described above must occur in synchronism with and in proper phase relation to the incoming aggregate multiplex signal. Since the aggregate signal contains transitions even when all channels idle, the information for holding synchronism with the incoming signal may be obtained by comparing the locally-generated timing wave with the incoming aggregate signal element train. This comparison is made in a phase detector portion of the receiver shown in Fig. 2*c*. The anode of tube V34A is connected to the grid of a start-of-mark generator tube V20A by a capacitor C62. The anode of tube V34A is nearly at +B when the aggregate signal is space, and is only slightly positive when the signal is on mark. A space-to-mark transition in the aggregate signal causes a negative transition in the voltage at the anode of tube V34A. This transition is differentiated in the grid circuit of tube V20A and blocks this tube forming a positive start-of-mark pulse at the anode of tube V20A. This waveform is represented by curve 1107. The grid of tube V20A is normally clamped to the cathode due to the positive grid bias applied by way of resistors R128, R129 and R127, but a start-of-mark pulse at the grid of tube V20A (negative pulse) overcomes this bias and serves to block tube V20A. Positive transitions at the anode of tube V34A occur at mark-to-space transitions and since the grid of tube V20A is clamped to the cathode, the resulting positive pulse developed at the grid of tube V20A is of very small amplitude. This results in a negligible change in the anode voltage of tube V20A at the end of a mark. Therefore, positive pulses are generated at the anode of tube V20A at start-of-mark transitions in the aggregate signal. The grid of tube V19A is coupled to the cathode of tube V15A by a capacitor C59 while the grid of tube V19B is coupled to the anode of tube V15A by a capacitor C60. The cathode voltage of tube V15A is shown by curve 1105 and the anode voltage by curve 1103. Tube V15A is a conventional paraphase amplifier, sometimes referred to as a phase inverter, to which the local-generated signal element timing wave is applied. The cathodes of tubes V19A and V19B are connected to minus (−) which is negative with respect to chassis or ground, while the grids of tubes V19A and V19B are connected to a more negative voltage by way of resistors R121 and R122. The bias so applied to tubes V19A and V19B is sufficient to block the tubes regardless of the polarity of the local signal element rate timing wave, which is applied to the grids of tubes V19A and V19B. The anode of tube V20A is connected to the grids of tubes V19A and V19B in push-push fashion by a capacitor C61 and resistors R120 and R125. When a start-of-mark pulse occurs part or all of the pulse will be coincident with the positive half-cycle of square wave local signal element rate timing wave applied to either tube V19A or V19B. When this pulse occurs coincident with the positive half-cycle of the timing wave, the pulse voltage plus the square wave voltage are sufficient to overcome the bias on the tube and the tube will conduct as long as the above coincidence lasts. Tubes V19A and V19B can only conduct during a start-of-mark pulse and then only when the local timing wave grid voltage is coincidently on the positive half-cycle. The desired relationship is to have the transitions in the timing wave occur at the center of the start-of-mark pulses as shown by curves 1109 and 1111. Due to the arrangement of the interconnections between the various portions of the receiver circuitry, if the start-of-mark pulses are entirely coincident with the positive half-cycles at the grid of tube V19A, it indicates that the local phase is retarded with respect to the desired relationship. If the start-of-mark pulses are entirely coincident with the positive local half-cycles at the grid of tube V19B, it indicates that the local phase is advanced with respect to the desired relationship. The information that the local phase is retarded or advanced, is therefore, contained in the form of anode current pulses in tube V19A or tube V19B respectively. The information thus obtained from tube V19A is integrated across a capacitor C56 (Fig. 2*a*) and the information from tube V19B is integrated across a capacitor C53. The pulses of anode current charge these capacitors negatively and when a certain negative voltage is reached, a correction of the local phase will be initiated. Resistors R118 and R123 serve to adjust the charging rate of capacitor C56 and C53 respectively and therefore control the rate at which correction may take place. The waveforms in the phase detector portion of the receiver are shown in Figs. 11 and 12, the former for four-channel operation and the latter for two-channel operation.

The actual phase shifting of the local frequency is controlled by the phase shifter and synchronizing portions of the circuit. Consider the section of the phase shifter labeled "Advance." Tubes V17A and V18B comprise a single-shot or monostable multivibrator 170 in which tube V17A is normally conducting. The anode current of tube V17A flowing through a resistor R114 blocks tube V18B. The cathode of tube V18B is connected to capacitor C56 and if the voltage at this point becomes sufficiently negative, tube V18B will conduct. If tube V18B conducts, the circuit is regenerative in the well-known manner. The voltage at the cathode of tube V18B when this tube starts to conduct is considerably negative. When tube V18B conducts, it blocks tube V17A due to cross-coupling by way of capacitor C57. With tube V17A blocked, the grid of tube V18B is clamped to the cathode of tube V18B due to the fact that the cathode voltage is negative and the grid of tube V18B is returned to ground through resistor R114. The current through tube V18B charges capacitor C56 in a positive direction and this action continues until the cathode voltage of tube V18B reaches ground potential. As the cathode of tube V18B continues to rise above ground potential, the grid of tube V18B is no longer clamped to the cathode, but rather remains at ground potential. Therefore, as the cathode of tube V18B rises above ground, it is applying negative bias to tube V18B and the regenerative action of the circuit quickly causes tube V18 to be blocked and tube V17A to conduct and remain in this condition. The circuit restores to its normal condition leaving the cathode of tube V18B slightly above ground potential and the circuit will remain in this condition until capacitor C56 is again charged sufficiently negative by the phase detector circuit to cause the above cycle to repeat itself. When multivibrator 170 is triggered, it is desired to cause the locally-generated timing wave to advance in phase, since the information on capacitor C56 is that the timing wave is retarded in phase from the desired position. In order to accomplish the actual phase shift in the timing wave, it is necessary that the triggering of the correction multivibrator occur synchronously with the timing wave and not at a random time dependent only on the charging of capacitor C56. In order to cause the actual firing of tubes V17A, V18B to occur synchronously with the local timing wave, synchronizing voltage is injected into the grid circuit of tube V17A by way of a capacitor C58 coupled to the anode of tube V6A. The square wave at the anode of tube V6A is differentiated in the grid circuit of tube V17A. The synchronizing pulses in the grid of tube V17A are amplified and appear on the grid of tube V18B, the positive pulses at the grid of tube V18B being effective in triggering the circuit. Multivibrator 170 is still under control of the information represented by the charge on capacitor C56 inasmuch as this voltage must reach a predetermined negative value before the circuit may be triggered. However, since the amplitude of the positive sync. pulses appearing on the grid of tube V18B is larger than the increment of voltage which can appear across capacitor C56 due to a start-of-mark pulse, the actual triggering of the circuit will be initiated by a sync. pulse after capacitor C56 has charged sufficiently negative. The cathode and grid of a correction tube V18A are connected in parallel with the cathode and grid respectively of tube V18B. When tube V18B is conducting, tube V18A is conducting and when tube V18B is blocked, tube V18A is blocked. The manner in which tube V18A accomplishes the correction is as follows. Due to the phase of the synchronizing pulse applied to the advance multivibrator, tube V3B is blocked at the time tubes V18A and V18B become conducting. When tube V18A conducts, a negative transition is formed at the anode of tube V18A, as shown by curve 423 of Fig. 4, and this is coupled through a capacitor C55 to the cathode of tube V3B. The negative pulse so developed at the cathode of tube V3B causes this tube to conduct, as will be seen on referring to curve 411. Normally, tube V3B would not have become conducting until the next input pulse to circuit 22 from tube V2B, the waveform of which is shown by curve 409. Flip-flop circuit 22 has, therefore, been caused to gain one half-cycle of its output frequency which is 2400 C. P. S. This phase shift in the local frequency amounts to a time shift of 0.20833 millisecond. A positive transition at the plate of tube V18A such as occurs when the advance multivibrator restores, has no effect on synchronizing circuit 22 since it is shorted by a diode D3 in the cathode circuit of tube V3B. As explained above, it is only the leading edge of the multivibrator output pulse which actually causes the advance correction to take place, and therefore, the active time of the advance multivibrator circuit is to discharge capacitor C56, that is, destroy the accumulated information which caused the previous correction to take place. The time constant of capacitor C56 and resistor R115 which normally govern the timing of such a single-shot or monostable multivibrator is made much longer than the length of time required for the cathode of tube V18B to reach ground potential. Therefore, the active time of the multivibrator is governed by the discharge of capacitor C56 which is the desired condition. Advance multivibrator 170 therefore accomplishes two operations: it causes an advance correction to occur and it discharges capacitor C56.

Tubes V16 and V4B comprise a retard multivibrator 160 which operates in a manner very similar to that described above for the advance multivibrator 170. Tube V4B is normally conducting. The information to cause a retard correction appears on capacitor C53 from the phase detector circuit. Retard multivibrator 160 is synchronized with the local frequency by connecting the grid circuit of correction tube V4B to the anode of tube V6B, by a capacitor C54. When retard multivibrator 160 is triggered, a positive transition is applied to the anode of tube V4B as shown by curve 419. This transition is applied to the grid of tube V4A by a capacitor C9. This transition is differentiated in the grid circuit of tube V4A. Due to the phase of the synchronizing pulse applied to the retard multivibrator 160, tube V3B is blocked at the time the retarding function is initiated. The positive pulse in the grid circuit of tube V4A from retard multivibrator 160 causes tube V4A to conduct. Tube V4A is normally non-conducting due to the bias applied to the cathode by way of resistors R19 and R20. The grid of tube V3B is held below cut-off by the conduction of tube V4A as shown in curve 421 for a length of time such that the succeeding pulse from tube V2B has no effect on synchronizing circuit 22. Normally tube V3B, at which the waveform shown by curve 411 appears, would have become conducting on the succeeding pulse from tube V2B, as shown by curve 409. Synchronizing circuit 22 has therefore been caused to lose one-half cycle of its output frequency which is 2400 C. P. S. This is equivalent to a time shift of 0.20833 millisecond in the local timing wave. A negative transition at the anode of tube V4B has no effect on circuit 22 since tube V4A is normally blocked. The pulse length at the anode of tube V4A shown by curve 421, that is, the time during which V4A is held conducting by the retard multivibrator, must be greater than one-half cycle and less than a whole cycle at a frequency of 2400 C. P. S. The values of capacitor C9 and resistors R21 and R22 are chosen so that the proper length pulse is applied to the grid of tube V4A. Only the leading edge of the retard multivibrator pulse is used to cause the correction to take place. As in the previous case, the active time of the multivibrator is governed by the discharge of capacitor C53. Therefore, retard multivibrator 160 causes the retard correction to take place, and discharges capacitor C53.

Both advance and retard multivibrators 170, 160 contain a neon lamp indicator N1, N2 in the anode circuit of the normally blocked tube. Each neon lamp glows only during the active time of its multivibrator, and gives a visual indication that a correction of the particular sense has taken place. Neon lamp N1 associated with advance multivibrator 170 indicates that the local phase has been advanced and incidently that the local fork frequency standard is slow compared to the fork frequency standard governing the multiplex transmitter. Similarly, neon lamp N2 associated with retard multivibrator 160 indicates that the local fork is fast. It will be noted that even though the desired relationship between the start-of-mark pulses and the local frequency (the transitions in the local frequency occurring at the center of the start-of-mark pulses) does exist, both advance and retard multivibrators 170, 160 continue to receive information by way of the charging of capacitors C53, C56, and therefore, the correction system continually hunts around the ideal alignment point. This hunting is not detrimental to the operation of the receiver for two reasons. The width of the pulse generated from start-of-mark transitions is very small compared to an aggregate signal element, and the steps of correction (0.20833 millisecond) are also very small compared to an aggregate signal element. The maximum misalignment caused by hunting of the correction circuits is therefore a very small fraction of an aggregate signal element.

The waveforms appearing in the circuitry when either advance or retard corrections take place are shown in Fig. 4.

CHANNEL PHASING CIRCUIT

The channel phasing correction circuits serve to line up the local frequency transitions with the incoming signal. The signal is a multiplex signal having time division aggregation as previously explained. It is additionally necessary that the channel A regenerator be operated when the aggregate signal element is the particular element in the aggregate signal which is assigned to channel A. If no further steps are taken to assure this, it would be equally probable that the channel A regenerator will operate when the aggregate signal is assigned to A, C, B or D. In order to obtain proper alignment of the channels, provision is made for manually moving the local phase in steps of one basic aggregate time element until the proper channel alignment is obtained. Tubes V14A and V14B (Fig. 2*c*) comprise a flip-flop or bistable multivibrator circuit 54. A channel phasing push-button switch SW2 connects synchronizing voltage to either the cathode of tube V14A or tube V14B. Switch SW2 is normally in the position shown to apply the timing wave obtained from the cathode of tube V15A to the cathode of tube V14A by way of a capacitor C49 and a resistor R98. The local square wave at the cathode of tube V15A is differentiated in the network comprising capacitor C49 and resistor R98, and the resulting negative pulses cause tube V14A to conduct. The positive pulses in the cathode circuit of tube V14A have no effect, since they are shorted by a diode D4. When the phasing switch is pushed, it will connect the cathode of tube V15A to the cathode circuit of tube V14B via the above-mentioned capacitor C49 and resistor R98. This contact, however, may be established at any random time. Regardless of when the contact is made, the next negative transition occurring at the cathode of tube V15A will cause tube V14B to conduct. Tube V14B is therefore permitted to conduct by pushing the phasing button but the actual switching of the multivibrator 54 is under control of the local timing wave obtained from tube V15A.

When channel switch SW3 is in the four-channel position shown, tube V14B is caused to conduct under control of the local timing wave as explained above. The local timing wave is supplied to the grid of tube V15A from the anode of tube V9B. Tube V14B is made to conduct on the first negative pulse from tube V15A following the operation of the switch SW2 to the normally open contact. When tube V14B conducts, a negative transition appears at the anode of tube V14B, and this is applied by way of capacitors C34 and C35 and resistors R71 and R72 to the cathodes of tube V11A and V11B, Fig. 2*b*. This negative pulse causes multivibrator 1100 to advance by one half-cycle of its output frequency. The equivalent time shift in the local phasing is an advance of one aggregate time element. When the phasing button SW2 is released, the normally closed contact and the succeeding negative pulse from tube V15A causes tube V14A to conduct, which in turn causes tube V14B to be blocked. When tube V14B is blocked, a positive transition appears at the anode of tube V14B. The resulting positive pulse coupled to the cathodes of tubes V11A and V11B has no effect on multivibrator circuit 1100 due to the shorting effect of diodes D5 and D6 in the cathode circuits of tubes V11A and V11B. Therefore, each time the phasing button SW2 is pushed and released, the local phase is advanced by one aggregate time element. When channel switch SW3 is in the two-channel position, circuit 54 operates as before under the control of the phasing button SW2, but is controlled in time by the timing wave. When tube V14B conducts, the resulting negative transition at the anode of tube V14B is coupled by capacitors C45 and C46 and resistors R90 and R91 to the cathodes of tubes V13A and V13B. The resulting negative pulse at the cathodes of tubes V13A and V13B causes multivibrator circuit 1300 to advance in phase by one half-cycle of its output frequency. The equivalent time shift in the local phasing is an advance of one aggregate two-channel time element. However, the basic time elements in the two-channel aggregate signal are twice as long as the basic time element in the four-channel aggregate signal. When the tube V14B blocks due to the release of the phasing push-button SW2, the resulting positive pulse has no effect on binary circuit 1300 due to the shorting effect of the diodes D7 and D8 in the cathode circuits of tubes V13A and V13B.

It has been shown that for either two- or four-channel operation, the local phase is caused to advance one aggregate time element for each push-and-release of the phasing push-button SW2. Thus, by manually operating phasing push-button SW2, the receiving channels may be properly lined up with the corresponding channels in the incoming aggregate signal. If, in the aggregate signal all channels are keying, a method of phasing is to observe the output of the printers or other end-use devices for the 5-unit channels. These will be correct for only one phase position out of a possible two or four depending on whether the aggregate signal is two- or four-channels. It is more desirable and quicker, however, to phase the receiver while all channels are transmitting an idle signal, that is, each single channel signal is marking. Under these conditions, phasing is to be accomplished with a known aggregate signal and a neon indicator is included to show when the receiver is in proper phase. A neon lamp N3 is connected between +B and a resistor R181, which in turn is connected by a resistor R173 to the anodes of tubes V28A and V29A, and by way of a resistor R186 to the anode of tube V30B. When channel A is marking, the anode of tube V29A should be at +B, and when channel C is marking, the anode of tube V30B should be at +B. If both channels A and C (single channel regenerated signals) are marking, no voltage is supplied to the neon phase indicator N3 and hence, it will not glow. If either channel A or channel C is spacing, sufficient voltage will be supplied and neon phase indicator N3 will glow. With either a two- or four-channel idle signal input, the phasing push-button is operated until neon phase indicator N3 remains extinguished, at which time the receiver is properly phased. In practice, when idling, channel A in a five-unit aggregate signal, whether two- or four-channel, is always marking. Channel C, in a five-unit aggregate four-channel signal is always spacing when idling, but is inverted to marking output by connection to the appropriate anode of the channel C regenerator. When proper alignment of the receiver is obtained on a two-channel signal (channels A and B), channel C regenerator output always remains on steady mark. There is only one phase position for which phase indicator neon lamp N3 will remain unlighted to indicate the proper phase alignment, for either a two- or four-channel five-unit aggregate signal.

APPENDIX

Figure 2D:
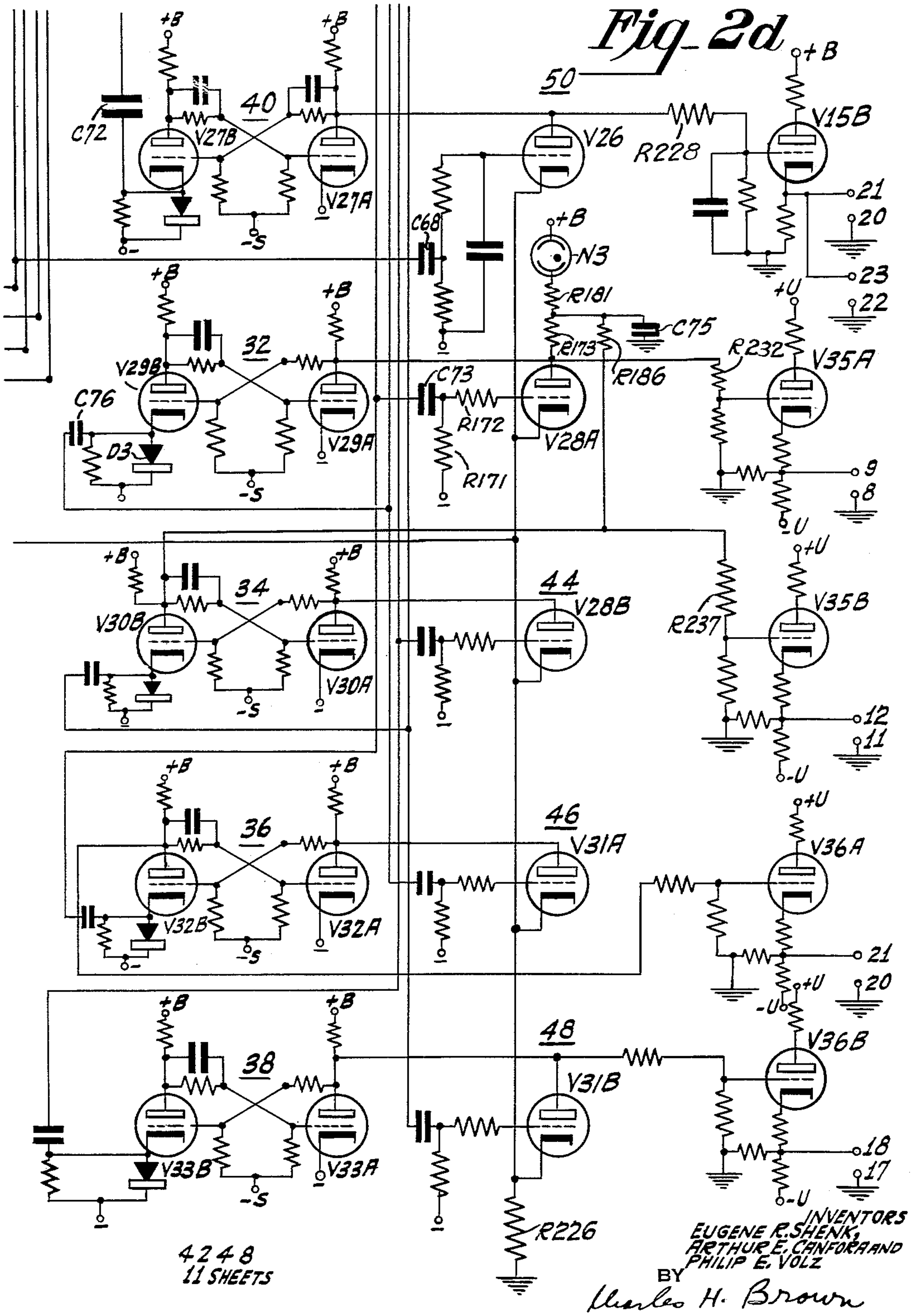

The following component part values were used in construction of an electronic multiplex receiver as shown in Fig. 2 and mentioned in the foregoing specification operating at either 21³⁄₇ C. P. S. or 25 C. P. S. corresponding to 42⁶⁄₇ or 50 bauds channel speeds respectively. Obviously, other values can also be employed at suitable channel speeds.

*Capacitors*

| Reference No.: | | Value |
|---|---|---|
| C2 | μμfd | 500 |
| C9 | μμfd | 700 |
| C14 | μμfd | 200 |
| C16, C19, C20, C23, C26, C27, C32 and C33 | μμfd | 150 |
| C34, C35, C36 | μμfd | 500 |
| C39, C40, C43 and C44 | μμfd | 150 |
| C45, C46 | μμfd | 500 |
| C49 | μμfd | 200 |
| C53 | μfd | 0.1 |
| C54 | μμfd | 50.0 |
| C55 | μμfd | 500 |
| C56 | μfd | 0.1 |
| C57 | μfd | 0.02 |
| C58 | μμfd | 50.0 |
| C59, C60 | μfd | 0.05 |
| C61 | μfd | 0.01 |
| C62 | μμfd | 100.0 |
| C66 | μμfd | 350.0 |
| C67 | μfd | 0.25 |
| C68 | μμfd | 250.0 |
| C72 | μμfd | 100.0 |
| C73 | μμfd | 150.0 |
| C76 | μμfd | 100.0 |
| C86 | μμfd | 500.0 |
| C87 | μfd | 0.001 |

*Resistors*

| Reference No.: | | Value |
|---|---|---|
| R1 | kilohms | 100 |
| R3 | do | 330 |
| R4 | do | 220 |
| R7, R21 | do | 560 |
| R22, R71, R72, R87, R90, R91, R93 and R114 | kilohms | 100 |
| R115 | megohm | 1 |
| R118 | kilohms | 82 |
| R120 | do | 560 |
| R121 | megohms | 2.2 |
| R122 | kilohms | 560 |
| R123 | do | 82 |
| R125 | do | 560 |

*Resistors—Continued*

| Reference No. | | Value |
|---|---|---|
| R127 | kilohms | 820 |
| R128 | do | 100 |
| R129 | megohms | 1 |
| R145 | kilohms | 430 |
| R146 | do | 12 |
| R147, 149, 150 | megohms | 2.2 |
| R158 | kilohms | 200 |
| R160 | do | 68 |
| R161 | megohms | 2.2 |
| R171, 172 | do | 1 |
| R173 | do | 3.3 |
| R181 | kilohms | 100 |
| R186 | megohms | 3.3 |
| R211, 212 | kilohms | 100 |
| R213 | do | 750 |
| R214 | do | 560 |
| R215 | do | 100 |
| R218 | megohms | 1.2 |
| R221 | do | 1.0 |
| R222 | kilohms | 8.2 |
| R223 | do | 100 |
| R224 | do | 2 |
| R226 | do | 220 |
| R228 | megohms | 4.4 |
| R232 | do | 2 |
| R282 | kilohms | 50 |

*Tubes*

| Reference number: | Type |
|---|---|
| V1A—V1B | 6SL7 |
| V2A—V2B; V3A—V3B | 6SN7 |
| V4A—V4B | 6SL7 |
| V5A—V5B through V13A—V13B inclusive | 6SN7 |
| V14A—V14B | 6SL7 |
| V15A—V15B | 6SN7 |
| V16A — V16B; V17A; V18A — V18B; V19A—V19B | 6SL7 |
| V20A—V20B; V22A—V22B | 6SN7 |
| V23A — V23B; V24A — V24B; V25A—V25B; V26; V27A—V27B through V34A—V34B inclusive | 6SL7 |
| V35A—V35B; V36A—V36B | 6SN7 |

*Diodes*

| Reference No.: | Type |
|---|---|
| D1, D2, D3, D4, D5, D6 | IN34A |

*Neon glow lamps*

| Reference No.: | Type |
|---|---|
| N1, N2, N3, N4 | NE51 |

The invention claimed is:

1. An electronic multiplex telegraph receiver circuit arrangement including a tone signal converter circuit producing a direct current on-off aggregate telegraph signal train, in response to a received aggregate tone signal, a frequency multiplying and dividing chain having a synchronizing section, means to apply substantially constant frequency energy to said chain to produce a plurality of harmonically related timing waves, a phase detector circuit, a phase splitting circuit connected to said phase detector circuit and coupled to said chain to apply at least one of said timing waves to said phase detector, means to apply said signal train to said phase detector to produce an output current proportional to the degree of phase difference between said signal train and said one timing wave, a phase shifter circuit coupled between said phase detector circuit and said synchronizing section of said frequency multiplying and dividing chain to synchronize said timing waves with said signal train, a signal gating circuit, a plurality of channel gating circuits connected to said signal gating circuit, a plurality of channel signal regenerating circuits individually connected to said channel gating circuits, means to apply said timing waves to said signal gating circuit, said channel gating and said channel regenerating circuits to present pulses thereat permutationwise rendering said channel gating and associated regenerating circuits operative in succession, said regenerating circuits being arranged to produce channel signal elements of one nature in response to application of aggregate signal elements of given nature to said signal gating circuit to pass pulses applied thereto by said timing wave application means, the latter pulses being applied to said channel gating circuits and the one of said channel gating circuits rendered operative by said timing wave means passing a pulse to the associated regenerating circuit, said regenerating circuits beng arranged to produce a channel signal element of another nature in response to application of aggregate signal elements of nature opposite to said given nature to said signal gating circuit, and a channel phasing circuit interposed in said frequency multiplying and dividing chain to step the permuted timing waves among said channel gating and regenerating circuits to maintain proper channel phase relationship.

2. An electronic multiplex telegraph receiver circuit arrangement for operation in response to an applied direct current on-off aggregate telegraph signal train including a frequency multiplying chain having a synchronizing section, means to apply substantially constant frequency energy to said chain to produce a plurality of harmonically related timing waves, a phase detector circuit coupled to said chain to apply at least one of said timing waves to said phase detector, means to apply said signal train to said phase detector to produce an output current proportional to the phase difference between said signal train and said one timing wave, a phase shifter circuit coupled between said phase detector circuit and said synchronizing section of said frequency multiplying chain to synchronize said timing waves with said signal train, a signal gating circuit, a plurality of channel gating circuits connected to said signal gating-circuit, a plurality of channel signal regenerator circuits individually connected to said channel gating circuits, means to apply said timing waves to said signal gating, said channel gating and said channel regenerating circuits to present pulses thereat permutationwise rendering said channel gating and associated regenerating circuits operative in succession, said regenerating circuits beng arranged to produce channel signal elements of one nature in response to application of aggregate signal elements of given nature to said signal gating circuit to pass pulses applied thereto by said timing wave application means, the latter pulses being applied to said channel gating circuits and the one of said channel gating circuits rendered operative by said timing wave means passing a pulse to the associated regenerating circuit, said regenerating circuits being arranged to produce a channel signal element of another nature in the absence of application of aggregate signal elements of said given nature to said signal gating circuit, and a channel phasing circuit interposed in said frequency multiplying chain to step the permuted timing waves among said channel gating and regenerating circuits to maintain proper channel phase relationship.

3. An electronic circuit arrangement for channelizing a single train of aggregate signal elements into a plurality of trains of channel signal elements including a wave generator for generating a plurality of electric waves harmonically related to the aggregate signal element rate, a plurality of bistable multivibrator circuits coupled to said wave generator to be triggered at channel signal element rate, a signal input circuit, means to couple sources of said aggregate signal elements to said signal input circuit, a plurality of controlled electron path devices having cathode electrodes connected in common, control and signal output electrodes individually coupled to said multivibrator circuits, means to couple said devices to said wave generator to apply said plurality of electric waves to said control electrodes in permutations at which but one of said controlled electron path devices is rendered conducting at any given time, said multivibrator circuits being individually coupled to the output electrodes of said plurality of controlled electron path devices, differentiating means interposed between said wave generator and the control electrodes to which said electric waves are applied to present pulses thereat, the differentiating means having time constants at which the pulses passed by said electron path devices are of different time duration from those applied to said multivibrators, means to connect said multivibrators to said controlled electron path devices to be triggered oppositely on application of signal elements of opposite nature to said devices.

4. An electronic system for channelizing a received aggregate direct current signal train into a plurality of direct current channel signal trains, including frequency multiplying and dividing circuit to produce a plurality of harmonically-related electric waves, a signal input circuit to which said aggregate signal train is applied, a phase detector circuit coupled to said signal input circuit and to said fraquency multiplying and dividing circuitry to produce an output current proportional to the phase difference between said received signal train and said plurality of timing waves, a phase shifter circuit coupled to said phase detector circuit to develop an electric charge in accordance with the degree of said phase difference, said frequency multiplying and dividing circuitry having a synchronizing section to which said electric charge is applied to render said electric waves in phase synchronism with said received aggregate signals, a plurality of channel signal element regenerator circuits, a plurality of channel gating circuits individually coupled to said regenerator circuits, a signal gating circuit coupled to all of said channel gating circuits, means to apply said electric waves to said gating and regenerator circuits to present pulses thereat, means to permute the phases of said waves among said circuits to render the channel regenerator circuits operative in succession, means to apply said received signal train to said signal gating circuit to pass a pulse applied to said channel gating circuits only when the signal element under consideration is of a given nature and the operative channel gating circuit responding to pass an applied pulse to the associated signal regenerator circuit to produce an output channel signal element of prearranged nature corresponding to said received aggregate signal element of given nature, said signal regenerator circuit being arranged to produce an output channel signal element of prearranged nature opposite to that corresponding to said aggregate signal element of given nature in the absence of the latter, and a channel phasing circuit coupled to said frequency multiplying and dividing circuitry to change the phase relationship between said electric waves to step the operation of said channel gating and regenerator circuits.

5. In an on-off signal receiving circuit of the type having a locally-generated wave utilized to produce an operating timing wave, means to synchronize said timing wave with the received signal, including a phase splitter circuit comprising an electron discharge device to which said locally-generated timing wave is applied to produce two comparing waves of phase opposition, a phase detector circuit comprising a pair of electron discharge systems biased to be brought to cut-off level individually by said comparing waves, means to develop a pulse train at the received signal element rate, means to apply said pulse train to said electron discharge systems, said electron discharge systems conducting only when said pulse train is above the level set by the comparing waves, a pair of capacitor elements individually connected to said electron discharge systems to be charged when the latter conduct, a pair of normally inactive monostable multivibrator circuits individually coupled to said capacitor elements and arranged to remain inactive until the charge in the associated capacitor elements attains a predetermined level, means to apply said timing wave to said monostable multivibrator circuits to activate the same upon the charges in the associated capacitor elements attaining said predetermined level, a bistable synchronizing multivibrator circuit normally actuated by said locally-generated wave to produce said timing wave, the outputs of said monostable multivibrator circuits being coupled to said synchronizing multivibrator circuit to advance and retard said timing wave by a half-cycle with respect to said locally-generated wave upon activation of the respective monostable multivibrator circuits.

6. In an on-off signal receiving circuit arrangement, automatic thresholding circuitry including a signal input circuit to which received signals are applied, a signal output circuit comprising an output electron discharge device having cathode, grid and anode electrodes, an output load impedance device connected to the anode electrode of said electron discharge device, a charge-storing capacitor, a diode device connected between said signal input circuit and said charge storing capacitor to store a charge therein proportional to the peak values of said applied signals, a voltage divider coupled across said charge storing capacitor and a cathode follower connection between said voltage divider and the cathode of said output electron discharge device to vary the bias on the latter proportionally to the amplitude of said applied signals, and a connection between said signal input circuit and the grid electrode of said electron output discharge device.

7. In an on-off signal receiving circuit arrangement of the type having a generator providing a primary timing wave of repetition rate substantially equal to the repetition rate of the received signal, a phasing circuit including a differentiating circuit, means to apply said received signals to said differentiating circuit to produce a train of pulses occurring at off-on transitions, a phase splitting circuit, means to apply said primary timing wave to said phase splitting circuit to obtain a pair of timing waves of opposing phase relationship, means to combine said train of pulses with each of said pair of timing waves, a pair of charge storage circuits, means to apply the combined pulse and timing waves individually to said charge storage circuits, said charge storage circuits being arranged to store an increment of charge only when the amplitude of said combined waves exceeds the amplitude of said timing waves alone, a pair of synchronizing circuits individually coupled between said charge storage circuits and said generator, said synchronizing circuits being arranged to step the phase of said timing wave upon the charges in the associated charge storage circuits reaching a predetermined value, and to discharge said charge storage circuits in readiness for the next charging cycle, the phase of said timing wave being advanced and retarded only when the rate of charge storage circuits is unequal, thereby to bring said primary timing wave into synchronism with said received signals.

8. In a multiplex signal receiver of the type having a plurality of channel signal element regenerating circuits under control of a timing wave of aggregate signal element rate, generated by means of a circuit arrangement having at least one bistable multivibrator, channel phasing circuitry including a neon lamp indicator coupled to at least one of said signal element regenerating circuits and arranged to glow on that circuit regenerating a signal element of given nature, a monostable multivibrator circuit including two electron discharge devices, a switching element arranged normally to apply said aggregate signal element rate timing wave to one of said electron discharge devices to produce pulses of given phase and selectively to the other of said electron discharge devices to produce a pulse one hundred and eighty degrees out of phase with said first pulses, the output of the other of said electron discharge devices being coupled to the bistable multivibrator of said timing wave generating circuit arrangement, whereby operation of said switching element to apply said timing wave to the other of said electron discharge devices will alter the phase of operation of said bistable multivibrator by one half-cycle to step said timing wave by one aggregate signal element.

9. In a multiplex signal receiver of the type having a plurality of pairs of channel signal element regenerating circuits under control of a timing wave of aggregate signal element rate generated by means of a circuit arrangement having at least one bistable multivibrator, the regenerating circuits of each pair producing signal elements of opposite nature, channel phasing circuitry including a neon lamp indicator coupled to one of said signal element regenerating circuits of each of said pairs and arranged to glow on those circuits regenerating a signal element of given nature, a monostable multivibrator circuit including two electron discharge devices, a switching element arranged normally to apply said aggregate signal element rate timing wave to one of said electron discharge devices to produce pulses of given phase and selectively to the other of said electron discharge devices to produce a single pulse of phase one hundred and eighty degrees from one of said pulses, the output of the other of said electron discharge devices being coupled to the bistable multivibrator of said timing wave generating circuit arrangement, whereby operation of said switching element to apply said timing wave to the other of said electron discharge devices will alter the phase of operation of said bistable multivibrator by one half-cycle to step said timing wave by one aggregate signal element, said switching element being operated until said neon lamp remains dark to indicate proper channel phase adjustment.

10. A circuit arrangement for channelizing a multiplex telegraph direct on-off signal, including means to generate a square wave of recurrence rate substantially equal to the recurrence rate of said signal, means to produce a plurality of square wave phase quadrature voltages of half said recurrence rate, an electronic signal gating circuit, a plurality of channel gating circuits coupled to said signal gating circuit, a differentiating circuit, means to apply said square wave to said differentiating circuit to produce a pulse wave, means to apply said pulse wave to said signal gating circuit, means to apply said signal to said signal gating circuit to present a pulse of said pulse wave to said channel gating circuits upon an aggregate signal element of given nature being applied to said signal gating circuit, a plurality of channel signal regenerating circuits coupled individually to said channel gating circuits, means to apply said phase quadrature timing waves individually to said channel gating and regenerating circuits, differentiating networks interposed in circuit with the last said means to present pulse trains to said circuits, said regenerating circuits being arranged to produce channel signal elements of one nature on application of pulses directly thereto, said channel signal gating circuits being arranged to apply pulses to the associated regenerating circuits in response to pulses applied from said signal gating circuits to cause the associated channel signal regenerating circuit to produce signal elements of opposite nature, the differentiating networks in circuit with said channel gating circuits having constants producing pulses of longer duration than produced by the remainder of said networks, thereby to nullify the pulses directly applied to said channel signal element regenerating circuits.

11. A multiplex signal channelizing circuit arrangement, including a plurality of electron discharge devices each having a cathode, a grid and an anode, a common cathode resistor connected to the cathodes of said devices, a plurality of bistable multivibrator circuits each having a pair of electron discharge structures comprising cathode, grid and anode electrodes, the anode electrodes of one of said discharge structures being connected to the anode of the corresponding electron discharge device, there being a diode connected in the cathode electrode circuit of each of the other of said discharge structures, differentiating networks comprising capacitors and resistors individual to the grid circuits of said discharge devices and the cathode electrodes of the others of said discharge structures, means to apply square wave voltages of aggregate signal element rate in phase quadrature relationship to said differentiating networks, means to apply aggregate signal element potential to the cathodes of said discharge devices, and output circuits individually coupled to said multivibrator circuits.

12. The circuit arrangement as claimed in claim 11 wherein the differentiating networks connected to the grids of said discharge devices have values at which the pulses produced are of longer duration than those produced at the cathode electrodes of said discharge structures.

13. The circuit arrangement as claimed in claim 11 wherein said output circuits develop currents of opposing directions in accordance with the opposing nature of channel signal elements regenerated.

14. The circuit arrangement as claimed in claim 11, wherein said aggregate signal element potential applying means is in the form of an electronic gating circuit including a controlled electron flow path device having cathode, control and anode elements, the anode-cathode path being coupled across the common cathode resistor of said discharge devices, a differentiating network connected to said anode element, means to apply a square wave voltage to said differentiating network to present pulses to said gating circuit, and means to apply received aggregate multiplex signals to the grid element of said path device.

15. An electronic receiver for time division multiplex operation including a signal input circuit to which a direct-current aggregate multiplex signal train is applied, a plurality of signal regenerator circuits having time constants adjusted to produce output signal trains at single-channel element rate, gating circuits coupled to said signal regenerator circuits, a source of timing waves in phase quadrature at single-channel element rate, means to permute said timing waves among said signal regenerator circuits to actuate the same in succession at single-channel element rate and among said gating circuits to present a wave to each gate in phase opposition to the wave presented to the associated regenerator, differentiating means in circuit with said means for permitting said timing waves to produce pulses at the transition thereof, the differentiating means for said gating circuits having different constants than those for said signal regenerator circuits to render the pulses developed in said gating circuits longer than those presented to said regenerator circuits, said gating circuits being actuated by the pulses developed in said signal gate to pass pulses of one nature to said signal gating circuits to cause said signal regenerator circuits to produce an output signal element of corresponding nature, said signal regenerator circuits otherwise producing an output signal element of opposite nature.

16. A tone signal converter circuit arrangement for converting an on-off tone signal to an on-off direct current signal wave, including input terminals to which said tone signal is applied, a full wave rectifier circuit coupled to said terminals to produce a direct current square wave signal corresponding to the envelope of said tone signals, a cathode follower circuit coupled to said rectifier circuit comprising a vacuum tube having a grid element coupled to said rectifier circuit and a cathode element, a resistor connected to said cathode element to constitute an output load circuit therefor, a diode element coupled to said cathode follower output circuit, a capacitor and a tapped resistor connected in parallel relationship to said diode element, a cathode follower circuit for developing a variable thresholding voltage comprising a triode vacuum tube having a control grid connected to the tapping on said tapped resistor and a cathode connected to an output resistor, and an output circuit from which said on-off direct current signal wave is obtained, said output circuit comprising a triode vacuum tube having a cathode connected to the cathode of said variable thresholding tube and a grid connected to the cathode element of said cathode follower circuit.

17. A tone signal converter circuit arrangement for converting an on-off tone signal to an on-off direct current signal wave, including input terminals to which said tone signal is applied, signal level adjusting potentiometer means connected across said terminals, a full wave rectifier circuit coupled to said level adjusting potentiometer means, a filter circuit coupled to said rectifier circuit to produce a direct current square wave signal corresponding to the envelope of said tone signals, a cathode follower circuit comprising a vacuum tube having a control element connected to said rectifier and filter circuits and a cathode, an output resistor connected to said cathode, a diode element coupled to said cathode follower output resistor, a capacitor and a tapped resistor connected in parallel across said diode tube element, a cathode follower tube for developing a variable thresholding voltage comprising a triode vacuum tube having a control grid connected to the tapping on said tapped resistor and a cathode connected to an output resistor, and an output circuit from which said on-off direct current signal wave is obtained, said output comprising a triode vacuum tube having a cathode connected to the cathode of said variable thresholding tube cathode, and a grid connected to the output resistor of said cathode follower circuit.

18. A tone signal converter circuit arrangement for converting an on-off tone signal to an on-off direct current signal wave, including input terminals to which said tone signal is applied, signal level adjusting potentiometer means connected across said terminals, a full wave rectifier circuit coupled to said level adjusting potentiometer means, a filter circuit coupled to said rectifier circuit to produce a direct current square wave signal corresponding to the envelope of said tone signals, a cathode follower circuit comprising a vacuum tube having a control element connected to said rectifier and filter circuits and a cathode, an output resistor connected to said cathode, a signal level indicating circuit connected to the output resistor of said cathode follower circuit, said indicating circuit comprising a triode vacuum tube having a cathode, a control grid coupled to said cathode follower, and an anode and a neon bulb connected between the anode and the cathode of said tube, means to bias said tube so that the striking-extinguishing voltage characteristic of said neon tube corresponds to the desired signal input level, a diode element coupled to said cathode follower output resistor, a capacitor and a tapped resistor connected in parallel across said diode tube element, a cathode follower tube for developing a variable thresholding voltage comprising a triode vacuum tube having a control grid connected to the tapping on said tapped resistor and a cathode connected to an output resistor, and an output circuit from which said on-off direct current signal wave is obtained, said output comprising a triode vacuum tube having a cathode connected to the cathode of said variable thresholding tube cathode, and a grid connected to the output resistor of said cathode follower circuit.

19. In multiplex receiving terminal apparatus an electronic circuit arrangement for synchronizing a locally generated timing wave with a received wave, including a bistable multivibrator synchronizing circuit, comprising a pair of electron discharge devices, each having cathode, control and anode electrodes regeneratively cross-coupled, a capacitor couped to said cathode electrodes and to which said locally generated timing wave is applied, said capacitor serving to differentiate said locally generated timing wave to pulse said bistable multivibrator circuit once for each cycle of said wave to produce waves at each of said electron discharge devices in antiphase relationship with respect to each other, a pair of correction electron discharge structures each having an anode, a grid and a cathode, a capacitor coupling the anode of one of said structures to the cathode of one of said pair of electron discharge devices, a lead connecting the anode of the other of said structures to the control electrode of said one electron discharge device, a pair of phase detection electron discharge systems each having cathode, control and anode elements, storage capacitors coupled individually to the anode elements of said electron discharge systems, a start-of-mark pulse generator coupled to the control elements of said electron discharge systems to apply pulses corresponding in time to transitions in said received wave thereto, means to apply timing waves derived from the output wave of said bistable multivibrator of recurrence rate substantially equal to the recurrence rate of said received wave and antiphase relationship with respect to each other to the control elements of said electron discharge systems to render the same conducting alternately and transfer a charge to one of said storage capacitors depending on the phase relationship between the transitions of said received wave and said timing waves, monostable multivibrator circuits individually connected between said storage capacitors and said electron discharge structures and arranged to be triggered upon the charges in the associated storage capacitors attaining a predetermined value, the monostable multivibrator circuit connected to the control electrode of said one electron discharge device having an unstable state time period longer than a half cycle and shorter than a full cycle of said locally generated wave in order to prevent pulsing said bistable multivibrator and thus effectively retarding the phase of said locally generated wave with respect to said received wave, the one monostable multivibrator having an unstable state time period at which a pulse is effectively injected in said local timing wave when the associated storage capacitor attains said predetermined charge.

20. An electronic circuit arrangement for synchronizing a given wave with another wave, including a bistable multivibrator circuit comprising a pair of electron discharge devices each having cathode, control and anode electrodes regeneratively cross-coupled, means to which said given wave is applied to differentiate said given wave and to pulse said bistable multivibrator circuit once for each cycle of said wave to produce an output wave across one of said electron discharge devices, a pair of correction electron discharge structures each having an anode, a grid and a cathode, means coupling the anode of one of said structures to the cathode of one of said electron discharge devices, means connecting the anode of the other of said structures to the control electrode of said one electron discharge device, a pair of phase detection electron discharge systems, each having cathode, control and anode elements, storage capacitors interposed in the individual anode-cathode paths of said electron discharge systems, means coupled to the control elements of said electron discharge systems to apply pulses corresponding in time to transitions in said other wave, means to apply timing waves of antiphase relationship with respect to each other, said waves being means derived from the output wave of said bistable multivibrator and of recurrence rate substantially equal to the recurrence rate of said other wave to the control elements of said electron discharge systems to render the same conducting alternately and transfer a charge to one of said storage elements depending on the phase relationship between the transitions of said other wave and said timing waves, monostable multivibrator circuits individually connected between said storage capacitors and said electron discharge structures and arranged to be triggered upon the charges in the associated storage capacitors attaining a predetermined value.

References Cited in the file of this patent

UNITED STATES PATENTS

| | | |
|---|---|---|
| 2,365,450 | Bliss | Dec. 19, 1944 |
| 2,444,950 | Nicholas | July 13, 1948 |
| 2,513,910 | Bliss | July 4, 1950 |
| 2,520,953 | Morris et al. | Sept. 5, 1950 |
| 2,609,452 | Hansen | Sept. 2, 1952 |

FOREIGN PATENTS

| | | |
|---|---|---|
| 613,084 | Great Britain | Nov. 22, 1948 |

(Corresponding U. S. 2,609,452 Sept. 2, 1952)